United States Patent
Batt

(10) Patent No.: US 10,046,377 B2
(45) Date of Patent: *Aug. 14, 2018

(54) AUTOMATED INSTALLATION OF FRANGIBLE ELEMENTS

(71) Applicant: The Boeing Company, Chicago, IL (US)

(72) Inventor: Edward John Batt, Bothell, WA (US)

(73) Assignee: The Boeing Company, Chicago, IL (US)

( * ) Notice: Subject to any disclaimer, the term of this patent is extended or adjusted under 35 U.S.C. 154(b) by 522 days.

This patent is subject to a terminal disclaimer.

(21) Appl. No.: 14/036,495

(22) Filed: Sep. 25, 2013

(65) Prior Publication Data

US 2015/0082605 A1 Mar. 26, 2015

(51) Int. Cl.
| | |
|---|---|
| *B23P 19/06* | (2006.01) |
| *B21D 39/00* | (2006.01) |
| *F16B 31/02* | (2006.01) |
| *B21J 15/02* | (2006.01) |
| *B21J 15/32* | (2006.01) |

(52) U.S. Cl.
CPC ............ *B21D 39/00* (2013.01); *B21J 15/022* (2013.01); *B21J 15/32* (2013.01); *B23P 19/06* (2013.01); *F16B 31/021* (2013.01); *B23P 2700/01* (2013.01); *Y10T 29/49908* (2015.01); *Y10T 29/53996* (2015.01)

(58) Field of Classification Search
CPC ..... B23P 19/005; B23P 19/06; B23P 2700/01; Y10T 29/53096; Y10T 29/53091; Y10T 29/53991; Y10T 29/53996; Y10T 29/49908; Y10T 29/53078; Y10T 29/49956; Y10T 29/53774; Y10T 29/49622; Y10T 29/49948; B21J 15/32; B21D 39/00
See application file for complete search history.

(56) References Cited

U.S. PATENT DOCUMENTS

| | | | | |
|---|---|---|---|---|
| 4,454,650 | A * | 6/1984 | Silver | A41H 37/04 227/149 |
| 4,593,583 | A | 6/1986 | Singleton | |
| 4,955,119 | A | 9/1990 | Bonomi et al. | |
| 5,265,317 | A * | 11/1993 | Angel | B23P 21/00 228/212 |
| 7,537,255 | B2 * | 5/2009 | Key | B25B 5/061 269/279 |

(Continued)

FOREIGN PATENT DOCUMENTS

EP 2628565 A1 8/2013

OTHER PUBLICATIONS

International Search Report and Written Opinion, dated Nov. 20, 2014, regarding Application No. PCT/US2014/050888, 12 pages.
(Continued)

*Primary Examiner* — Jacob Cigna
*Assistant Examiner* — Lee A Holly
(74) *Attorney, Agent, or Firm* — Yee & Associates, P.C.

(57) ABSTRACT

A method and an end effector for installing an element over a member associated with an object. An end effector may be attached to the object. The element may be loaded onto an element installer by an element loader of the end effector. The element may be installed onto the member associated with the object by the element installer.

21 Claims, 21 Drawing Sheets

(56) References Cited

U.S. PATENT DOCUMENTS

| | | | |
|---|---|---|---|
| 8,430,001 B2 | 4/2013 | Ortiz | |
| 8,651,046 B1 | 2/2014 | Davancens et al. | |
| 2002/0050043 A1* | 5/2002 | Sarh ........................ | B21J 15/10 |
| | | | 29/407.01 |
| 2008/0155807 A1* | 7/2008 | Toh ......................... | B21J 15/14 |
| | | | 29/525.01 |
| 2009/0260413 A1 | 10/2009 | Tomchick | |
| 2011/0197410 A1 | 8/2011 | Estep et al. | |
| 2012/0186405 A1 | 7/2012 | Ortiz | |
| 2013/0212883 A1* | 8/2013 | Soto Martinez ...... | B23P 19/005 |
| | | | 29/897.2 |
| 2014/0026719 A1* | 1/2014 | Stanfield ............. | B25B 23/0085 |
| | | | 81/13 |

OTHER PUBLICATIONS

Henderson et al., "Automated Installation of Frangible Elements," U.S. Appl. No. 14/692,325, filed Apr. 21, 2015, 119 pages.

Office Action, dated Jan. 11, 2016, regarding U.S. Appl. No. 14/692,325, 28 pages.

Final Office Action, dated Jun. 17, 2016, regarding U.S. Appl. No. 14/692,325, 11 pages.

Office Action, dated Mar. 21, 2017, regarding U.S. Appl. No. 14/692,325, 17 pages.

Final Office Action, dated Sep. 5, 2017, regarding U.S. Appl. No. 14/692,325, 15 pages.

Notice of Allowance, dated Jan. 30, 2018, regarding U.S. Appl. No. 14/692,325, 12 pages.

\* cited by examiner

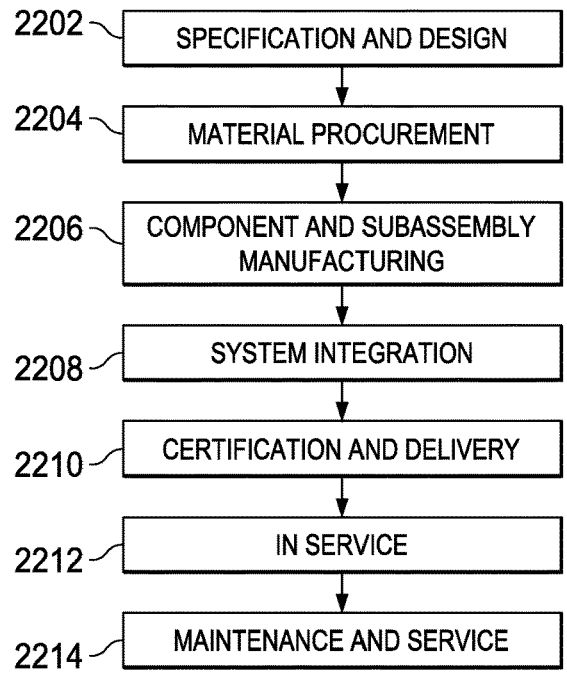
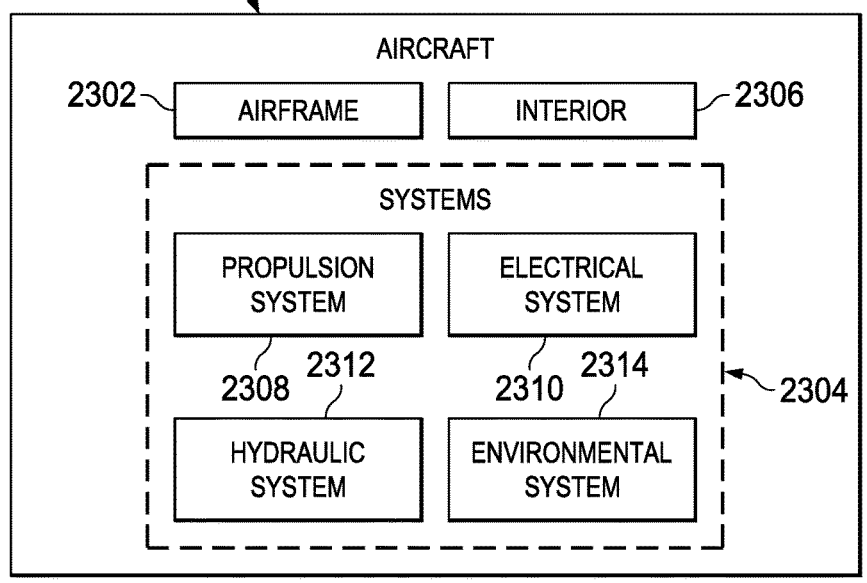

AUTOMATED INSTALLATION OF FRANGIBLE ELEMENTS

BACKGROUND INFORMATION

1. Field

The present disclosure relates generally to the installation of fastener elements and, in particular, to automating the installation of fastener elements. Still more particularly, the present disclosure relates to a method and apparatus for automating the installation of frangible elements, such as frangible collars.

2. Background

During manufacturing, different types of fastener elements may be installed in various types of objects. For example, without limitation, fastener elements, such as bolts, may be used to join a stackup of two or more parts together. Other fastener elements, such as collars, may then be used to secure and hold the parts together. In some cases, these collars may be referred to as nuts.

In some industries, such as the aerospace industry, fastener elements in the form of frangible collars may be used. As used herein, a "frangible collar" may be a collar having one portion of the collar that is designed to break off from another portion of the collar at a selected torque. The portion that is designed to break off may be referred to as the nut of the frangible collar, while the portion that remains may be referred to as the collar.

As one example, when a frangible collar is being threaded onto a threaded bolt, the nut portion of the frangible collar may break off once a selected torque has been reached to leave the collar portion of the frangible collar threaded onto the threaded bolt. The use of frangible collars may allow a collar and bolt to be assembled without having to control the torque applied by a torque wrench to ensure that the applied torque is within specified tolerances.

With some currently available methods for installing frangible collars, the nuts that break off from the collars may become foreign object debris (FOD). This foreign object debris may cause undesired effects within a manufacturing environment. For example, without limitation, when the nut portion of a frangible collar breaks off from the collar portion of the frangible collar, the nut portion may break off in an uncontrolled manner and/or in an undesired direction. In particular, the nut portion may break off and impact a piece of equipment or machinery within the manufacturing environment in an undesired manner.

Further, some currently available methods for installing frangible collars require that the installation be performed manually. For example, without limitation, these methods may require that a human operator or human-operated machinery thread a frangible collar onto a bolt. However, performing this type of installation manually may be more time-consuming and labor-intensive than desired.

In certain industries, manufacturing is moving towards automated manufacturing. It may be desirable to have a system for automating the installation of frangible collars such that the integration of robotic automation and the manual installation of frangible collars may not be needed in future manufacturing environments. Therefore, it may be desirable to have a method and apparatus that take into account at least some of the issues discussed above, as well as other possible issues.

SUMMARY

In one illustrative example, an apparatus may comprise an attachment system, an element loader, and an element installer. The attachment system may be configured to attach the end effector to an object. The element loader may be configured to hold a number of elements. The element installer may be configured to receive an element in the number of elements from the element loader. The element installer may be further configured to install the element onto a member associated with the object.

In another illustrative embodiment, an end effector may comprise an attachment system, an element loader, an element installer, and a removal system. The attachment system may be configured for use in attaching the end effector to an object. The element loader may be configured to hold a number of frangible collars in which a frangible collar in the number of frangible collars may include a nut portion and a collar portion. The element installer may be configured to receive the frangible collar from the element loader. The element installer may comprise a rotatable member and a retaining member. The rotatable member may be configured to rotate the frangible collar when the frangible collar is placed over a threaded fastener associated with the object to install the frangible collar onto the threaded fastener. The nut portion of the frangible collar may be configured to separate from the collar portion of the frangible collar when a torque being applied to the frangible collar by rotation of the frangible collar reaches a selected threshold. The retaining member may be configured to receive the frangible collar from the element loader and retain the frangible collar. The retaining member may retain the nut portion of the frangible collar after the nut portion separates from the collar portion of the frangible collar. The removal system may be configured for use in discarding the nut portion of the frangible collar that separates from the collar portion.

In yet another illustrative example, a method for installing an element over a member associated with an object may be provided. An end effector may be attached to the object. The element may be loaded onto an element installer by an element loader of the end effector. The element may be installed onto the member associated with the object by the element installer.

In still yet another illustrative embodiment, a method for installing a frangible collar may be provided. An end effector may be clamped to a stackup of parts using a clamping system. A frangible collar held by an element loader of the end effector may be loaded onto an element installer of the end effector. The element installer may be moved such that the frangible collar is positioned over an installation feature of the clamping system. The frangible collar may be moved onto a threaded fastener installed through the stackup of parts through the installation feature. A torque may be applied to the frangible collar to thread the frangible collar onto the threaded fastener. A nut portion of the frangible collar may be separated from a collar portion of the frangible collar when the torque being applied to the frangible collar reaches a selected threshold. The nut portion may be moved away from the threaded fastener to leave the collar portion installed on the threaded fastener. The nut portion may be discarded using a removal system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 22 is an illustration of an aircraft manufacturing and service method in the form of a block diagram in accordance with an illustrative embodiment; and FIG. 23 is an illustration of an aircraft in the form of a block diagram in which an illustrative embodiment may be implemented.

DETAILED DESCRIPTION

The illustrative embodiments recognize and take into account different considerations. For example, the illustrative embodiments recognize and take into account that it may be desirable to have a system for automating the installation of frangible collars. Further, the illustrative embodiments recognize and take into account that it may be desirable to have a system for automating the capture and discarding of the nut portions of frangible collars that break away from the collar portions of the frangible collars.

Figure 1:
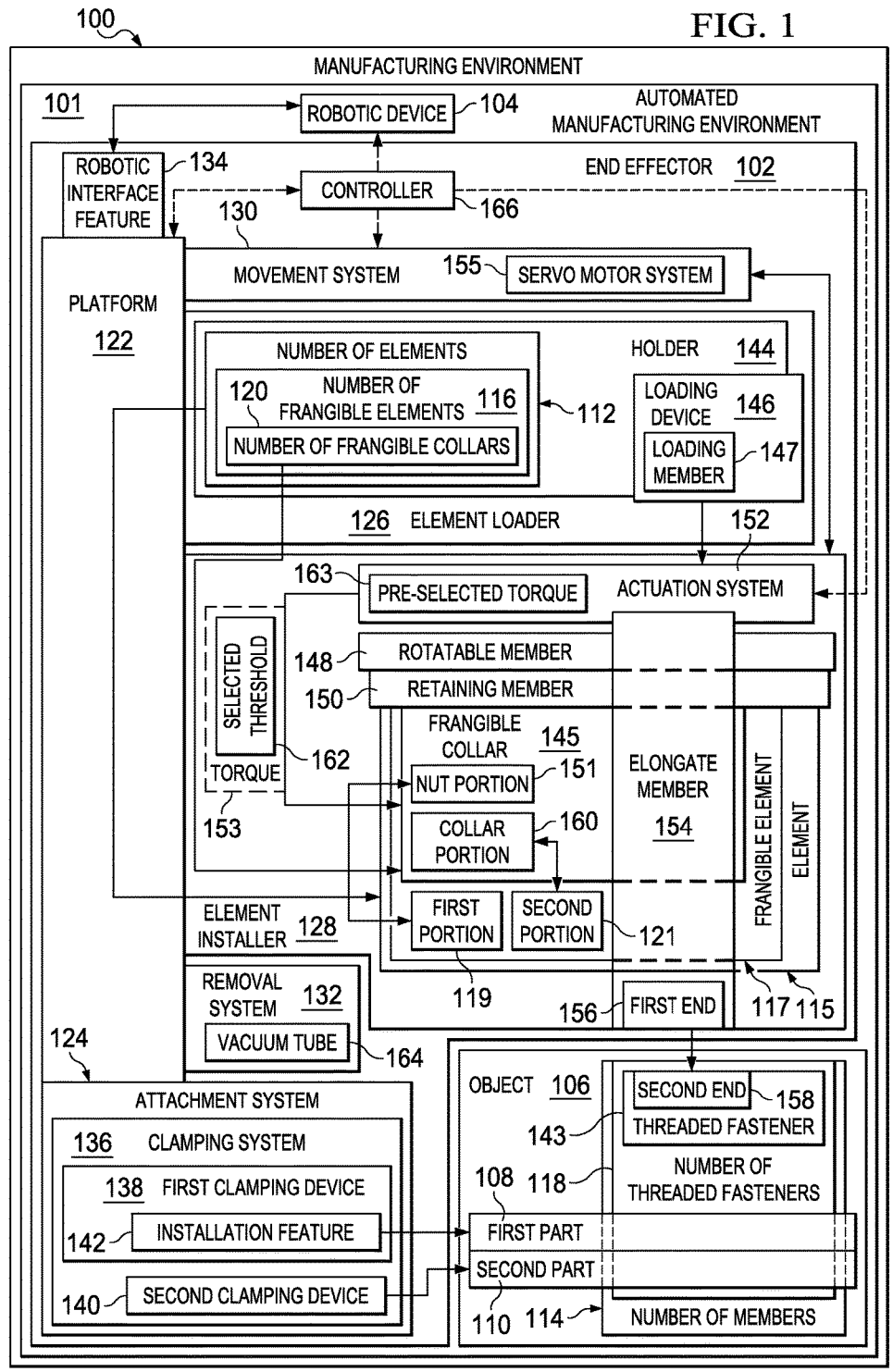
FIG. 1 is an illustration of a manufacturing environment in the form of a block diagram in accordance with an illustrative embodiment.

Referring now to the figures and, in particular, with reference to FIG. 1, an illustration of a manufacturing environment is depicted in the form of a block diagram in accordance with an illustrative embodiment. In this illustrative example, manufacturing environment 100 may be an environment in which different types of parts may be manufactured and/or assembled. Manufacturing environment 100 may take the form of automated manufacturing environment 101 in this example.

As depicted, end effector 102 may be used within automated manufacturing environment 101. End effector 102 may be configured to be moved and, in some cases, operated by, robotic device 104. Robotic device 104 may be implemented in a number of different ways. Depending on the implementation, robotic device 104 may take the form of a robotic arm, a robotic vehicle, or some other type of robotic device.

End effector 102 may be associated with robotic device 104. As used herein, when one component is "associated" with another component, the association is a physical association in the depicted examples.

For example, without limitation, a first component, such as end effector 102, may be considered to be associated with a second component, such as robotic device 104, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

In this illustrative example, end effector 102 may be configured to install fastener elements on object 106. Object 106 may take a number of different forms. For example, without limitation, object 106 may be a single part, a sub-assembly, or an assembly of parts. In this illustrative example, object 106 may be a stackup of parts that includes, for example, without limitation, first part 108 and second part 110. End effector 102 may be configured to install number of elements 112 onto number of members 114 already installed in object 106.

As used herein, a "number of" items may be one or more items. In this manner, number of elements 112 may include one or more elements. Further, number of members 114 may include one or more members.

In one illustrative example, number of members 114 may be inserted through openings in both first part 108 and second part 110 to join these two parts together. Number of elements 112 may be installed onto number of members 114 to secure number of members 114 to first part 108 and second part 110 such that first part 108 and second part 110 may remain joined together.

Number of elements 112 may take the form of number of frangible elements 116 in this illustrative example. For example, frangible element 117 in number of frangible elements 116 may be an example of one implementation for element 115 in number of elements 112. As used herein, a "frangible element," such as frangible element 117, may have first portion 119 configured to break off from second portion 121 of frangible element 117 once a torque being applied to frangible element 117 has reached a selected threshold.

In one illustrative example, number of members 114 may be implemented as number of threaded fasteners 118. In particular, a member in number of members 114 may be implemented as a threaded fastener in number of threaded fasteners 118, such as threaded fastener 143. Threaded fastener 143 may take the form of a threaded bolt, a screw, or some other type of threaded fastener.

In this example, number of frangible elements 116 may be implemented as number of frangible collars 120 configured to be threaded onto number of threaded fasteners 118. Frangible collar 145 may be an example of a frangible collar in number of frangible collars 120. In particular, frangible collar 145 may be an example of one implementation for frangible element 117. As depicted, frangible collar 145 may have nut portion 151 configured to break away from collar portion 160 of frangible collar 145 in response to torque 153 that is being applied to frangible collar 145 reaching selected threshold 162. Nut portion 151 and collar portion 160 of frangible collar 145 may be examples of first portion 119 and second portion 121, respectively, of frangible element 117.

End effector 102 may be used to automate the process of installing number of frangible collars 120 on number of threaded fasteners 118. As depicted, end effector 102 may include platform 122, attachment system 124, element loader 126, element installer 128, movement system 130, and removal system 132. Attachment system 124, element loader 126, element installer 128, movement system 130, and/or removal system 132 may be associated with platform 122.

In this illustrative example, robotic interface feature 134 may be associated with platform 122. Robotic interface feature 134 may be an interface for use in attaching end effector 102 to robotic device 104. Robotic device 104 may be used to move end effector 102 relative to object 106. For example, without limitation, robotic device 104 may move platform 122 of end effector 102 to position end effector 102 relative to object 106.

Attachment system 124 may be used to attach end effector 102 to object 106 such that end effector 102 remains in a fixed position relative to object 106 during the installation of number of frangible collars 120. In one illustrative example, attachment system 124 may take the form of clamping system 136. Clamping system 136 may include first clamping device 138 and second clamping device 140. First clamping device 138 may engage first part 108 of object 106, while second clamping device 140 may engage second part 110 of object 106. In this manner, first clamping device 138 and second clamping device 140 may together clamp to object 106.

In some cases, first clamping device 138 may include installation feature 142. Installation feature 142 may be used to install a threaded fastener, such as threaded fastener 143, in object 106, while first clamping device 138 and second clamping device 140 are clamped to the stackup of first part 108 and second part 110. Installation feature 142 may take the form of, for example, without limitation, a hollow portion, or channel, through which threaded fastener 143 may be inserted and then installed through first part 108 and second part 110.

Once threaded fastener 143 has been installed, a frangible collar, such as frangible collar 145, may be installed onto threaded fastener 143. Element loader 126 and element installer 128 may be used to perform this installation.

As depicted, element loader 126 may include holder 144 and loading device 146. In one illustrative example, holder 144 may be implemented as a structure configured to hold multiple frangible collars. In particular, holder 144 may hold a set of frangible collars, from which frangible collar 145 may then be selected for installation. Loading device 146 may be used to load frangible collar 145 held by holder 144 onto element installer 128. Loading device 146 may include, for example, without limitation, loading member 147 that may be actuated to load frangible collar 145 onto element installer 128.

Element installer 128 may include rotatable member 148, retaining member 150, actuation system 152, and elongate member 154. Rotatable member 148 may be configured to receive frangible collar 145. Retaining member 150 may be configured to retain frangible collar 145 and secure frangible collar 145 to rotatable member 148. For example, without limitation, loading device 146 may be used to load frangible collar 145 onto rotatable member 148 through retaining member 150 such that retaining member 150 can form some type of fit with frangible collar 145. This fit may be, for example, without limitation, a snap-fit. In this illustrative example, retaining member 150 may be configured to hold nut portion 151 of frangible collar 145.

Movement system 130 may be used to move element installer 128 towards element loader 126 such that frangible collar 145 may be loaded onto rotatable member 148. Further, movement system 130 may be used to move element installer 128 away from element loader 126 and towards installation feature 142 once frangible collar 145 has been loaded onto rotatable member 148.

Movement system 130 may include any number of devices and/or components needed to move element installer 128 and/or other components of end effector 102. In one illustrative example, movement system 130 may include servo motor system 155 capable of moving element installer 128.

Movement system 130 may position element installer 128 over installation feature 142 such that retaining member 150 and rotatable member 148 holding frangible collar 145 may be positioned over installation feature 142. Element installer 128 may then be used to install frangible collar 145 onto threaded fastener 143 through installation feature 142.

In particular, actuation system 152 may be configured to move elongate member 154 of element installer 128 towards threaded fastener 143 through installation feature 142. Actuation system 152 may be comprised of one or more actuation devices and/or other types of components. For example, without limitation, actuation system 152 may include an actuated air cylinder. Actuation system 152 may continue to push elongate member 154 until first end 156 of elongate member 154 comes into contact with threaded fastener 143. First end 156 of elongate member 154 may be configured to engage second end 158 of threaded fastener 143.

In one illustrative example, second end 158 of threaded fastener 143 may have a socket. In other words, threaded fastener 143 may have a depression at second end 158 of threaded fastener 143 that forms a socket configured to receive an object having substantially the same shape as the socket. In this example, the socket may have a hexagonal shape. Threaded fastener 143 may be a socket screw, also referred to as a socketed bolt.

First end 156 of elongate member 154 may have a shape configured to engage the socket at second end 158 of threaded fastener 143. For example, first end 156 of elongate member 154 may have a hexagonal shape configured to fit within the hexagonal socket of threaded fastener 143. First end 156 of elongate member 154 may be referred to as a hex key, an Allen wrench, or an Allen key.

In some cases, first end 156 of elongate member 154 may not readily engage second end 158 of threaded fastener 143 when elongate member 154 is moved towards second end 158 through installation feature 142. In other words, first end 156 may not be properly aligned, rotationally, with second end 158, such that first end 156 is not received within the hexagonal socket of second end 158. However, in other cases, first end 156 may readily engage second end 158 when elongate member 154 is moved towards threaded fastener 143.

Actuation system 152 may be configured to rotate rotatable member 148 in any number of directions to allow first end 156 of elongate member 154 to engage second end 158 of threaded fastener 143 and to allow collar portion 160 of frangible collar 145 to engage the threads on threaded fastener 143. Once collar portion 160 of frangible collar 145 has engaged the threads on threaded fastener 143, actuation system 152 may rotate rotatable member 148 to thread collar portion 160 onto threaded fastener 143.

This rotation may result in torque 153 being applied to frangible collar 145. When selected threshold 162 for torque 153 has been reached, nut portion 151 may separate from collar portion 160 of frangible collar 145. In other words, nut portion 151 may break away, or break off, from collar portion 160. However, nut portion 151 may remain retained by retaining member 150.

In this manner, collar portion 160 of frangible collar 145 may be installed onto threaded fastener 143. Actuation system 152 may be programmed to apply preselected torque 163 to frangible collar 145. Preselected torque 163 may be substantially equal to or greater than selected threshold 162 for torque 153. In this manner, any undesired effects on threaded fastener 143 outside of selected tolerances caused by the threading of collar portion 160 onto threaded fastener 143 may be prevented.

Once collar portion 160 has been installed, movement system 130 may move element installer 128 away from installation feature 142 and towards removal system 132. In this illustrative example, removal system 132 may be used to capture and discard nut portion 151 still being held by retaining member 150. As depicted, removal system 132 may include vacuum tube 164.

Movement system 130 may position element installer 128 over removal system 132 such that nut portion 151 is positioned over an opening in vacuum tube 164. Actuation system 152 may be configured to move elongate member 154 in a direction towards vacuum tube 164 to cause nut portion 151 to be released from retaining member 150. Once nut portion 151 is released from retaining member 150, nut portion 151 may enter vacuum tube 164 and be consequently discarded.

In this illustrative example, controller 166 may be configured to control the operation of at least one of actuation system 152, movement system 130, and robotic device 104. As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Controller 166 may be implemented using hardware, software, or a combination of the two. Depending on the implementation, controller 166 may be implemented using at least one of a computer system comprised of one or more computers, a processor unit, an integrated circuit, a microprocessor, or some other type of data processing system or processor. Controller 166 may be considered part of end effector 102 in this illustrative example, and may be associated with platform 122. However, in other illustrative examples, controller 166 may be considered separate from end effector 102. For example, without limitation, controller 166 may be configured to control movement system 130 and actuation system 152 using wired and/or wireless connections.

For example, without limitation, controller 166 may use preprogrammed settings to control the number of rotations, the different directions of rotation, and/or the number of degrees of rotation by which rotatable member 148 is rotated for the installation of each of number of frangible collars 120. Further, controller 166 may control selected threshold 162 for torque 153.

In this manner, the installation of number of frangible collars 120 may be automated. This type of installation system and method may increase the speed and efficiency with which frangible collars may be installed on threaded fasteners. Further, this type of installation system and method may reduce the amount of debris generated within automated manufacturing environment 101 when installing frangible collars.

The illustration of manufacturing environment 100 and end effector 102 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, end effector 102 may not be used to install number of members 114 in object 106. Rather, a different end effector (not shown) may be used to install number of members 114.

In other illustrative examples, attachment system 124 may be implemented using some other type of device other than clamping system 136. For example, without limitation, attachment system 124 may attach end effector 102 to object 106 using a clasp, a locking mechanism, a combination of fastening devices, and/or other types of components.

Figure 2:
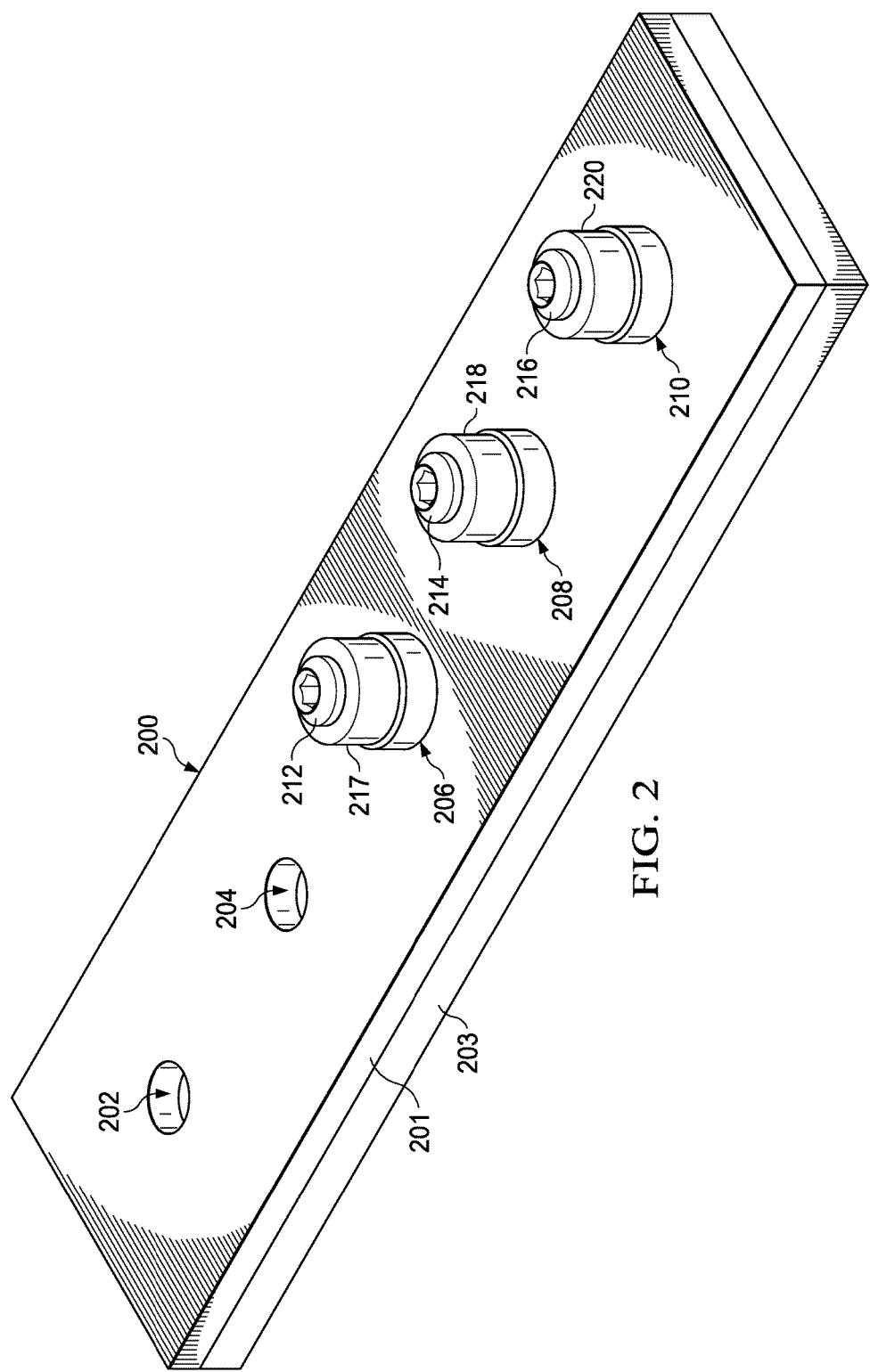
FIG. 2 is an illustration of an object in accordance with an illustrative embodiment.

With reference now to FIG. 2, an illustration of an object is depicted in accordance with an illustrative embodiment. In this illustrative example, object 200 may be an example of one implementation for object 106 in FIG. 1. As depicted, object 200 may include first part 201 and second part 203, which may be examples of implementations for first part 108 and second part 110, respectively, in FIG. 1. First part 201 and second part 203 may form a stackup of parts.

Object 200 may have holes 202, 204, 206, 208, and 210 configured to receive threaded fasteners. These holes may extend through both first part 201 and second part 203. In this illustrative example, threaded fasteners 212, 214, and 216 have been installed in object 200. Threaded fasteners 212, 214, and 216 may be examples of implementations for threaded fasteners in number of threaded fasteners 118 in FIG. 1.

In this illustrative, collar 217, collar 218, and collar 220 may already be installed onto threaded fasteners 212, 214, and 216, respectively. The process used to install collar 217 onto threaded fastener 212 may be described in FIGS. 3-19 below.

With reference now to FIGS. 3-19, illustrations of the steps used to install collar 217 from FIG. 2 onto threaded fastener 212 from FIG. 2 may be depicted in accordance with an illustrative embodiment. In FIGS. 3-19, end effector 300 may be used to install collar 217 from FIG. 2 onto threaded fastener 212 from FIG. 2. End effector 300 may be an example of one implementation for end effector 102 in FIG. 1.

Figure 3:
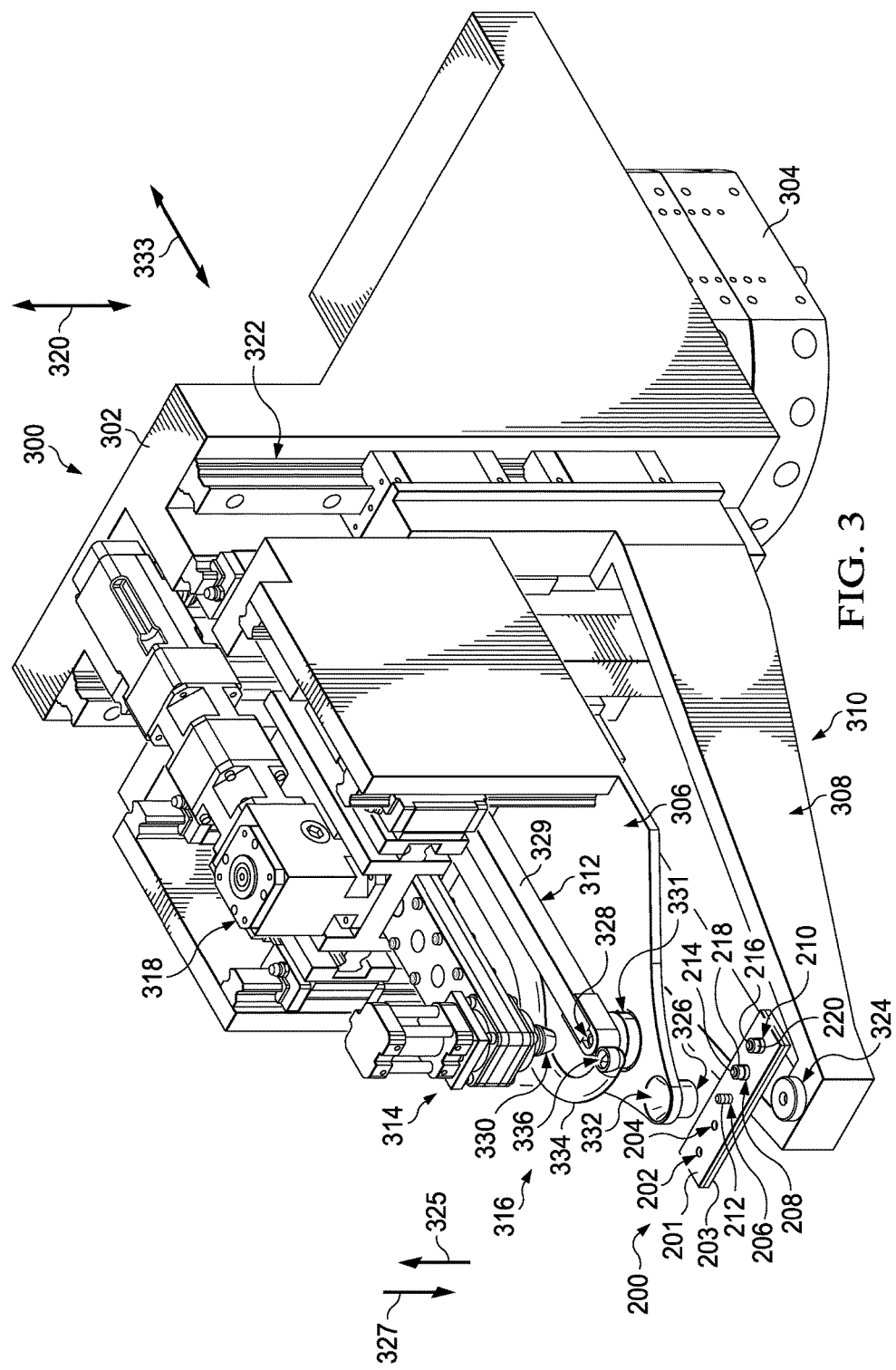
FIG. 3 is an illustration of an isometric view of an end effector being positioned relative to an object in accordance with an illustrative embodiment.

Turning now to FIG. 3, an illustration of an isometric view of end effector 300 being positioned relative to object 200 is depicted in accordance with an illustrative embodiment. In this illustrative example, end effector 300 may be moved towards and positioned relative to object 200 from FIG. 2. End effector 300 may be an example of one implementation for end effector 102 in FIG. 1.

As depicted, end effector 300 may include platform 302 having robotic interface feature 304. Robotic interface feature 304 may be used to attach end effector 300 to a robotic device (not shown), such as robotic device 104 described in FIG. 1. The robotic device (not shown) may be configured to move and manipulate end effector 300.

End effector 300 may include first clamping device 306 and second clamping device 308. First clamping device 306 and second clamping device 308 may be examples of implementations for first clamping device 138 and second clamping device 140, respectively, in FIG. 1. First clamping device 306 and second clamping device 308 may form clamping system 310, which may be an example of one implementation for clamping system 136 in FIG. 1. In this manner, clamping system 310 is an example of an attachment system, such as attachment system 124 in FIG. 1.

In addition to clamping system 310, end effector 300 may also include element loader 312, element installer 314, removal system 316, and movement system 318. Element loader 312, element installer 314, removal system 316, and movement system 318 may be examples of implementations for element loader 126, element installer 128, removal system 132, and movement system 130, respectively, in FIG. 1. As depicted, clamping system 310, element loader 312, element installer 314, removal system 316, and movement system 318 may all be associated with platform 302.

The robotic device (not shown) attached to end effector 300 may move end effector 300 such that first clamping device 306 and second clamping device 308 of end effector 300 are positioned relative to object 200. In this illustrative example, first clamping device 306 may be positioned over first part 201, while second clamping device 308 may be positioned over second part 203. First clamping device 306 and second clamping device 308 may be moved along Z-axis 320 to allow end effector 300 to be clamped to and unclamped from object 200.

As depicted, rail system 322 may be associated with platform 302 in this illustrative example. Rail system 322 includes rails along which each of first clamping device 306 and second clamping device 308 may be moved in a direction along Z-axis 320. For example, without limitation, first clamping device 306 may be moved along rail system 322 in the direction of arrow 327 towards first part 201. Second clamping device 308 may be moved along rail system 322 in the direction of arrow 325 towards second part 203. In this manner, first clamping device 306 and second clamping device 308 may be moved towards each other to clamp end effector 300 to object 200.

In this illustrative example, second clamping device 308 may have engagement feature 324 configured to engage threaded fastener 212 on the side of second part 203. Further, first clamping device 306 may have installation feature 326 configured to engage threaded fastener 212 on the side of first part 201. Installation feature 326 may be an example of one implementation for installation feature 142 in FIG. 1.

Installation feature 326 may be positioned over threaded fastener 212 such that installation feature 326 fits over threaded fastener 212 when first clamping device 306 is moved towards first part 201. In other illustrative examples, installation feature 326 may be positioned over hole 206 such that threaded fastener 212 may be inserted through installation feature 326 into hole 206.

As depicted, element loader 312 may include holder 329 and loading device 331. Holder 329 and loading device 331 may be examples of implementations of holder 144 and loading device 146, respectively, in FIG. 1. Holder 329 may be configured to hold multiple frangible collars (not shown in this view). Loading device 331 may be used to load these frangible collars onto element installer 314.

Element installer 314 may be configured to receive a frangible collar (not shown) at end 330 of element installer 314. In particular, loading device 331 may be used to load the frangible collar (not shown) onto end 330 of element installer 314 through opening 328 in holder 329.

Element installer 314 may then be moved by movement system 318 to position end 330 over opening 332 of installation feature 326 such that the frangible collar (not shown) held at end 330 may be installed over fastener 212 through installation feature 326. Movement system 318 may be configured to move element installer 314 in the direction of X-axis 333 and/or the direction of Z-axis 320.

When the frangible collar (not shown) has been fully installed over fastener 212, the nut portion of the frangible collar may break away from the collar portion of the frangible collar. The nut portion may remain held at end 330, while the collar portion may remain over the fastener. The nut portion of the frangible collar may then be discarded using removal system 316.

Removal system 316 may include vacuum tube 334. Vacuum tube 334 may be an example of one implementation for vacuum tube 164 in FIG. 1. Movement system 318 may be used to move element installer 314 over opening 336 to vacuum tube 334. Element installer 314 may then discard the nut portion by sending the nut portion into vacuum tube 334 through opening 336.

Figure 4:
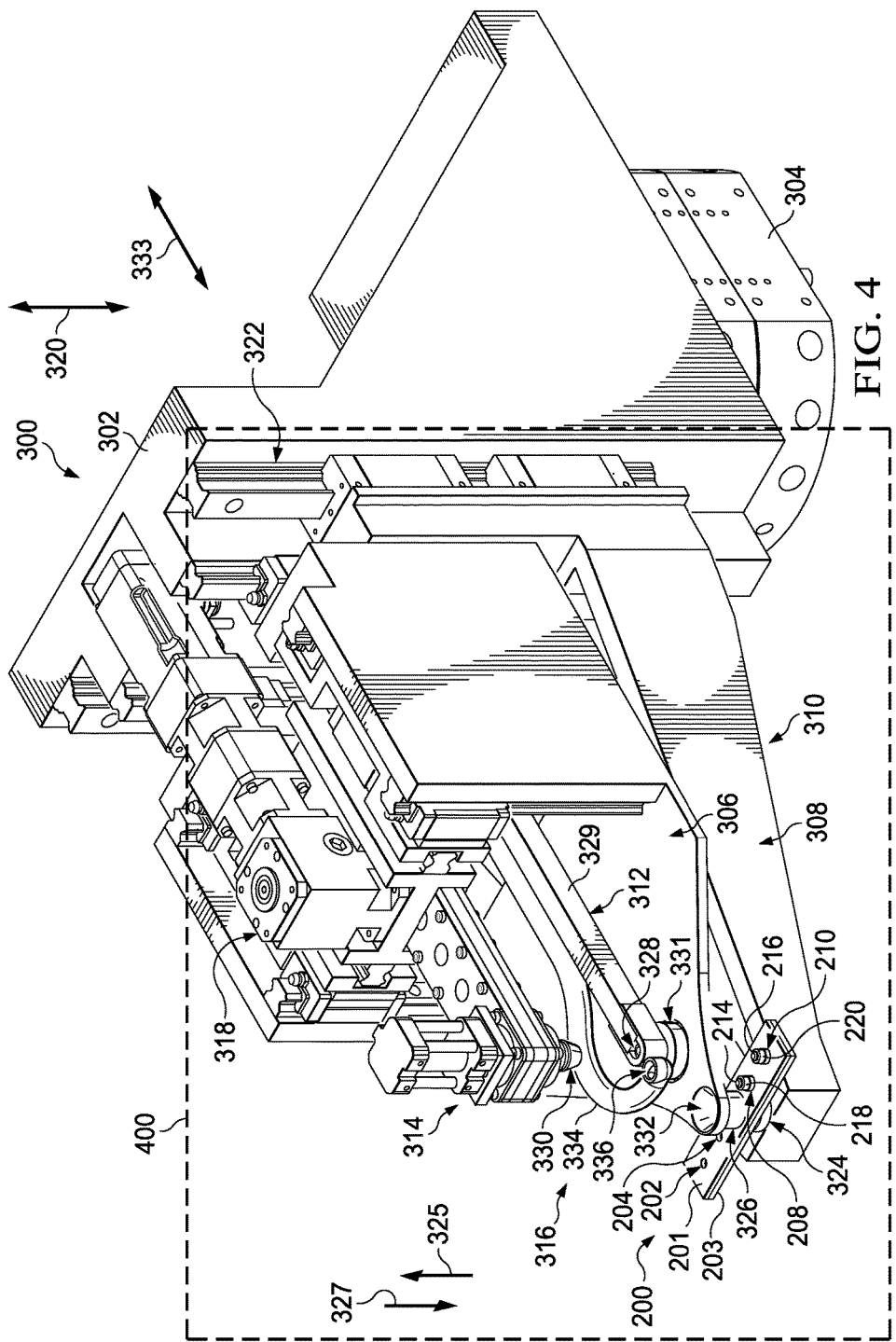
FIG. 4 is an illustration of an end effector clamped to an object in accordance with an illustrative embodiment.

Turning now to FIG. 4, an illustration of end effector 300 from FIG. 3, clamped to object 200 from FIGS. 2-3, is depicted in accordance with an illustrative embodiment. In this illustrative example, first clamping device 306 and second clamping device 308 have been used to clamp end effector 300 to object 200. As depicted, installation feature 326 may fully cover fastener 212 seen in FIGS. 2-3.

Once end effector 300 has been clamped to object 200, element installer 314 may be moved by movement system 318 towards element loader 312 such that a frangible collar (not shown in this view) may be loaded onto end 330 of element installer 314. An enlarged view of portion 400 of end effector 300 with element installer 314 positioned over opening 328 in holder 329 is depicted in FIG. 5 below.

Figure 5:
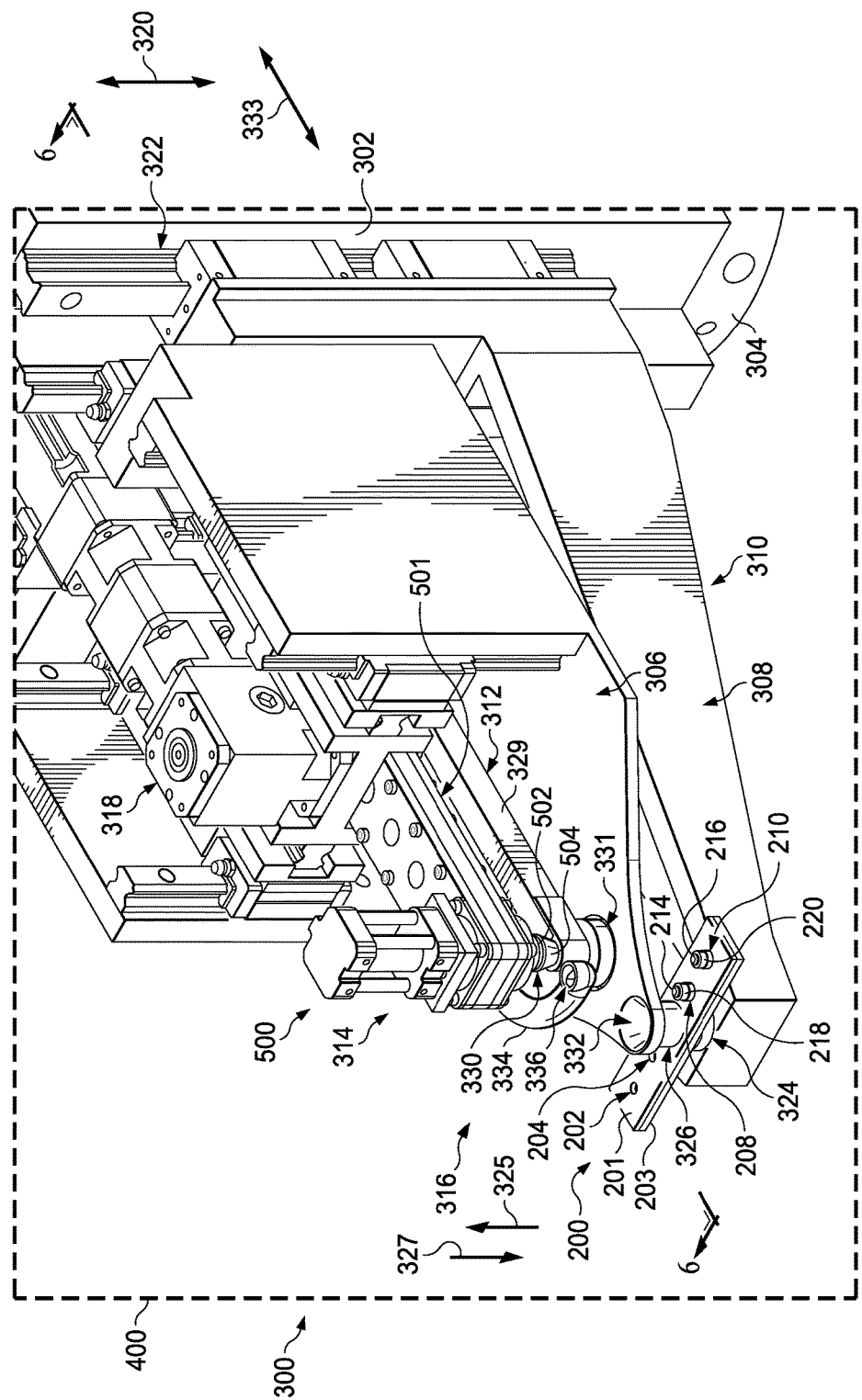
FIG. 5 is an illustration of a portion of an end effector with an element installer positioned over an element loader in accordance with an illustrative embodiment.

With reference now to FIG. 5, an illustration of portion 400 of end effector 300 from FIG. 4 with element installer 314 positioned over element loader 312 is depicted in accordance with an illustrative embodiment. In this illustrative example, element installer 314 has been moved such that end 330 is positioned over loading device 331.

Element installer 314 may include actuation system 500, rotatable member 502, and retaining member 504. Actuation system 500, rotatable member 502, and retaining member 504 may be examples of implementations for actuation system 152, rotatable member 148, and retaining member 150, respectively, in FIG. 1. In this illustrative example, actuation system 500 and rotatable member 502 may be associated with base 501. Base 501 may be moved and manipulated using movement system 318.

Figure 6:
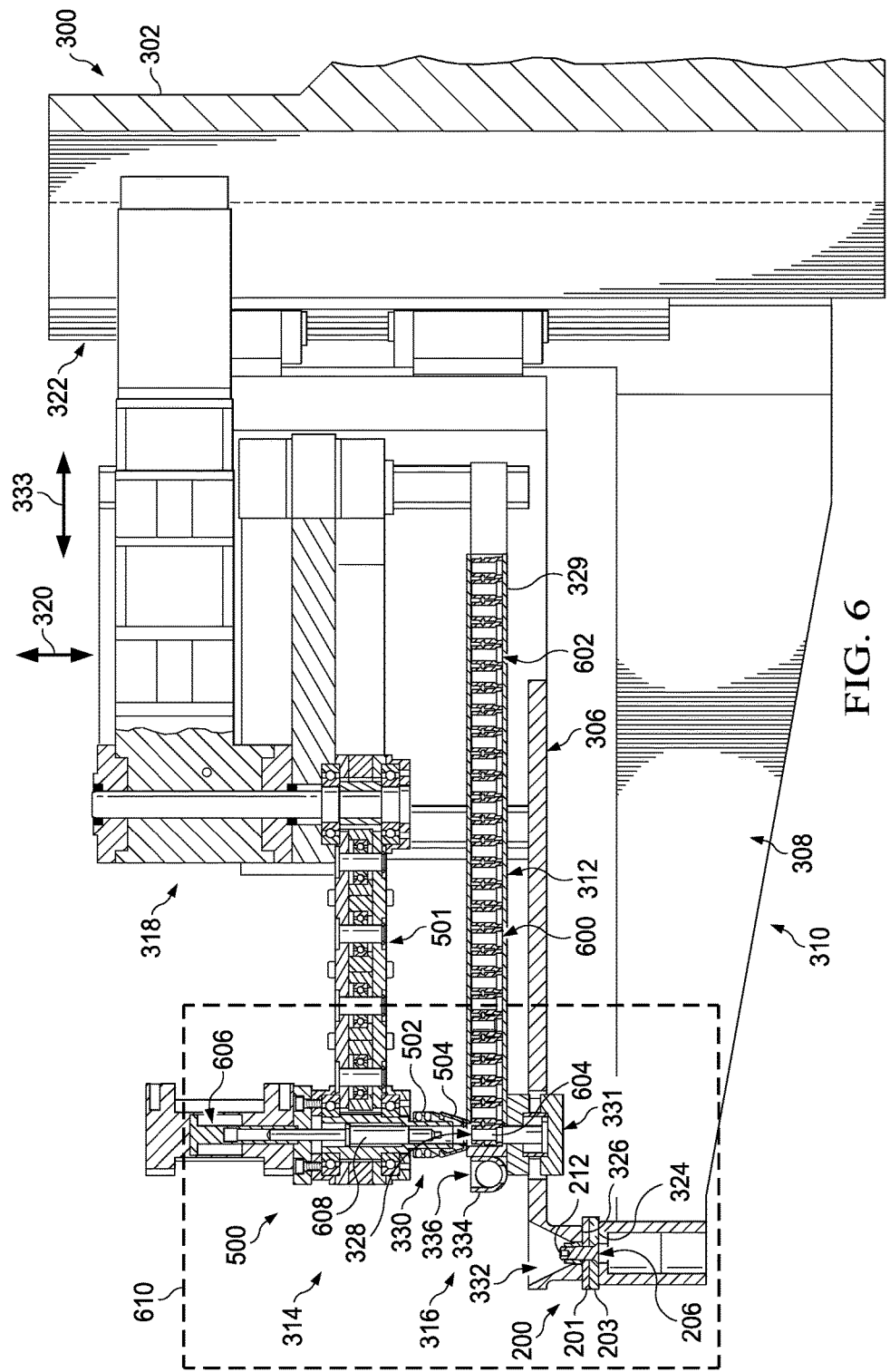
FIG. 6 is an illustration of a cross-sectional view of a portion of an end effector in accordance with an illustrative embodiment.

With reference now to FIG. 6, an illustration of a cross-sectional view of portion 400 of end effector 300 from FIG. 5 is depicted in accordance with an illustrative embodiment. In this illustrative example, a cross-sectional view of portion 400 of end effector 300 may be depicted taken with respect to lines 6-6 in FIG. 5.

In this illustrative example, chamber 600 within holder 329 may be seen. Chamber 600 may hold frangible collars 602. Frangible collars 602 may be an example of one implementation for number of frangible collars 120 in FIG. 1. In this manner, frangible collars 602 may be an example of one manner in which number of frangible elements 116 in FIG. 1, and thereby number of elements 112 in FIG. 1, may be implemented.

Frangible collar 604 may be one of frangible collars 602. Frangible collar 604 may be an example of a frangible element, such as frangible element 117 in FIG. 1, and thereby an element, such as element 115 in FIG. 1.

Figure 7:
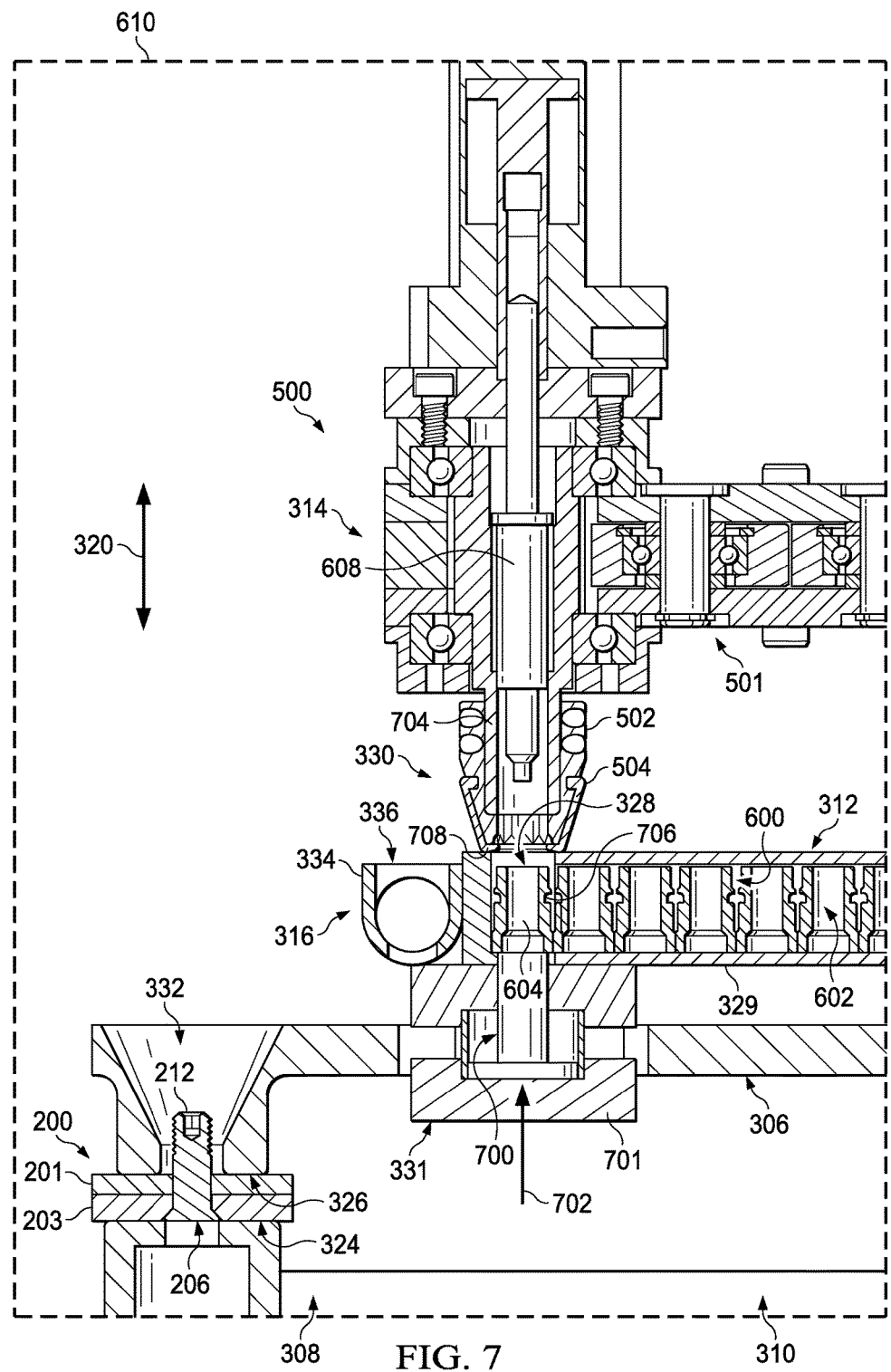
FIG. 7 is an illustration of an enlarged view of a portion of an end effector in accordance with an illustrative embodiment.

As depicted, frangible collar 604 may be the particular frangible collar that is next in line to be loaded onto end 330 of element installer 314. Loading frangible collar 604 onto end 330 may include pushing frangible collar 604 towards retaining member 504 and rotatable member 502 of element installer 314. An enlarged view of portion 610 of end effector 300 is depicted in FIG. 7 below. Further, the manner by which frangible collar 604 may be loaded onto end effector 300 is described in FIGS. 7-9 below.

In FIG. 6, actuation system 500 of element installer 314 may include piston device 606. Piston device 606 may be configured to control the movement of elongate member 608 of element installer 314 along Z-axis 320. Once frangible collar 604 has been loaded onto element installer 314, piston device 606 and elongate member 608 may be used to install frangible collar 604 over fastener 212.

Turning now to FIG. 7, an illustration of an enlarged view of portion 610 of end effector 300 from FIG. 6 is depicted in accordance with an illustrative embodiment. As depicted, loading device 331 may include loading member 700 and cylinder 701. Loading member 700 may be an example of one implementation for loading member 147 in FIG. 1.

Cylinder 701 may be an air cylinder configured to exert a force on loading member 700 in the direction of arrow 702. In other words, cylinder 701 may be used to move loading member 700 in the direction of arrow 702 such that frangible collar 604 may also be moved in the direction of arrow 702 towards element installer 314.

As depicted, frangible collar 604 may have groove 706. Groove 706 may separate the nut portion of frangible collar 604 from the collar portion of frangible collar 604. Groove 706 may be used for loading frangible collar 604 onto element installer 314.

In particular, frangible collar 604 may be moved in the direction of arrow 702 until interface feature 708 of retaining member 504 snaps into groove 706 of frangible collar 604. Once interface feature 708 of retaining member 504 snaps into groove 706, frangible collar 604 may be considered held by retaining member 504.

In this illustrative example, rotatable member 502 of element installer 314 may be able to independently move relative to structure 704 of element installer 314 along Z-axis 320. In other words, rotatable member 502 may be configured to float relative to structure 704.

Figure 8:
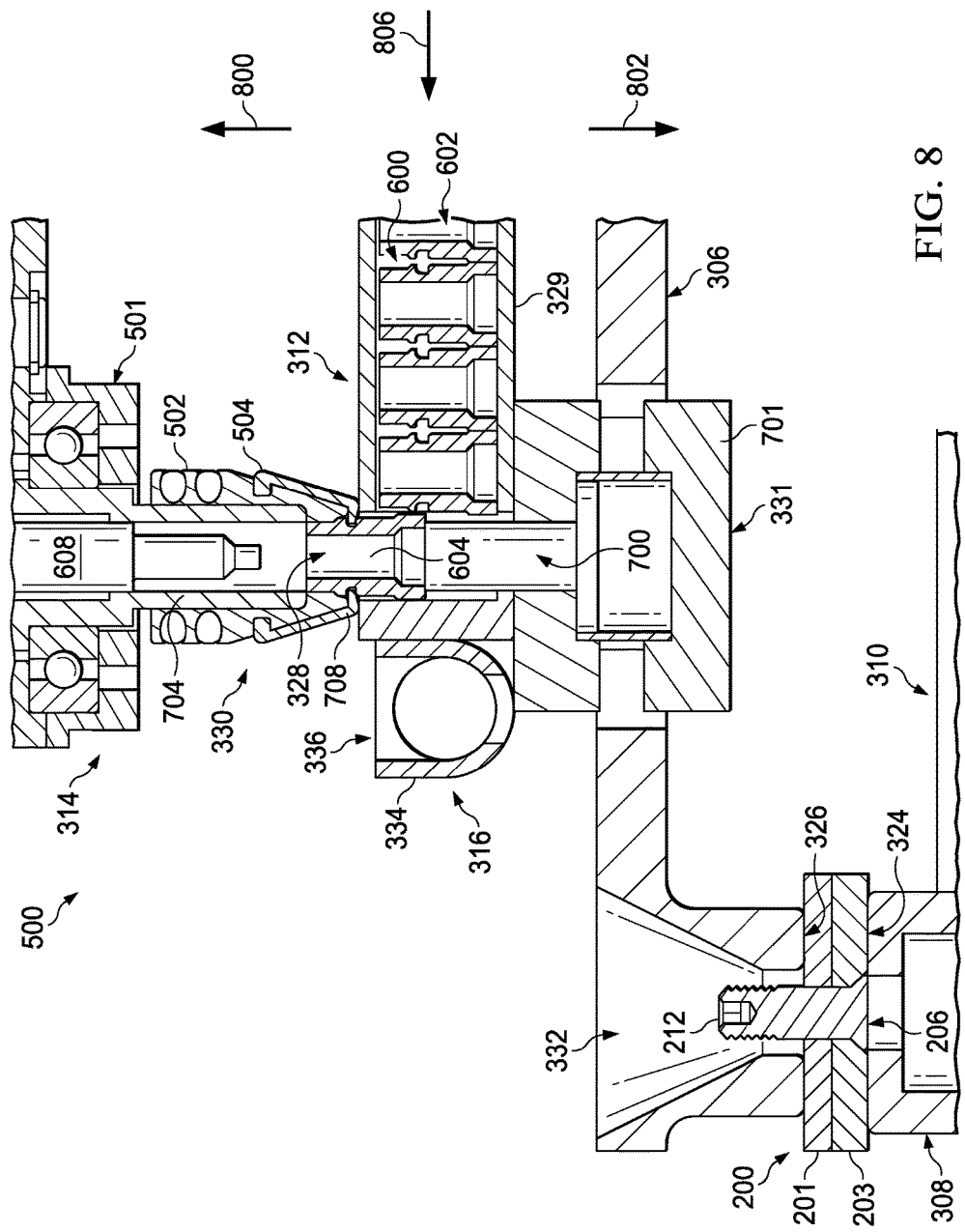
FIG. 8 is an illustration of a frangible collar being held by a retaining member in accordance with an illustrative embodiment.

Turning now to FIG. 8, an illustration of frangible collar 604 being held by retaining member 504 is depicted in accordance with an illustrative embodiment. In this illustrative example, interface feature 708 has snapped into groove 706 of frangible collar 604.

Element installer 314 may be moved away from element loader 312 in the direction of arrow 800. Further, loading member 700 may be moved back in the direction of arrow 802 such that the next frangible collar 804 may be moved into position over loading member 700. In particular, frangible collar 804 may be moved in the direction of arrow 806 once frangible collar 604 has been moved away from element loader 312 and loading member 700 has moved back down in the direction of arrow 802.

Figure 9:
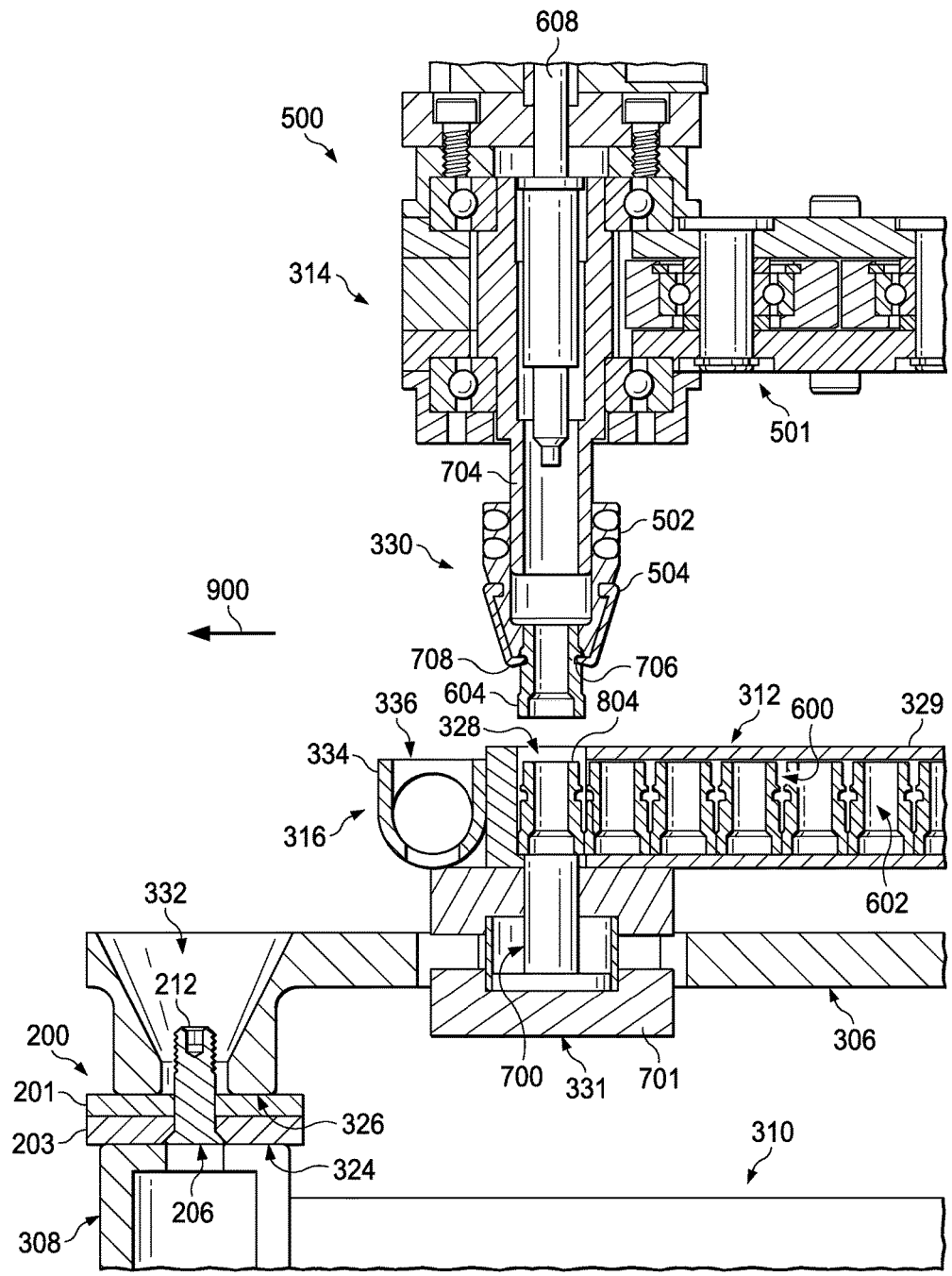
FIG. 9 is an illustration of an element installer being moved away from an element loader in accordance with an illustrative embodiment.

With reference now to FIG. 9, an illustration of element installer 314 being moved away from element loader 312 is depicted in accordance with an illustrative embodiment. In this illustrative example, element installer 314 may be moved away from element loader 312 and then moved towards opening 332 in installation feature 326 in the direction of arrow 900. In particular, element installer 314 may be moved in the direction of arrow 900 such that frangible collar 604 held by retaining member 504 may be positioned over opening 332.

Figure 10:
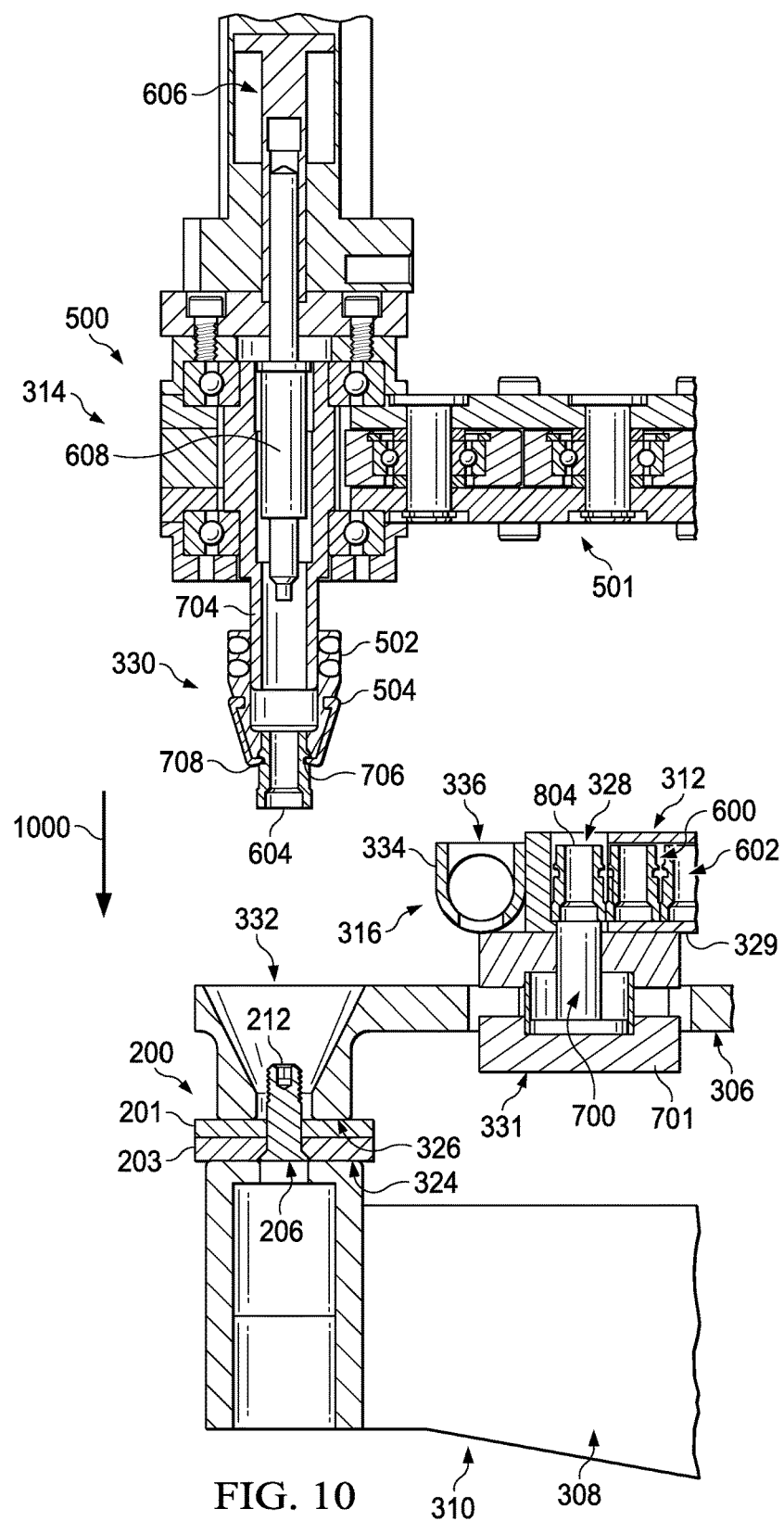
FIG. 10 is an illustration of a frangible collar held by a retaining member positioned over an opening in accordance with an illustrative embodiment.

Turning now to FIG. 10, an illustration of frangible collar 604 held by retaining member 504 positioned over opening 332 is depicted in accordance with an illustrative embodiment. Once frangible collar 604 has been positioned over opening 332, actuation system 500 may be used to move frangible collar 604 into opening 332. In particular, actuation system 500 may be used to move frangible collar 604 in the direction of arrow 1000 into opening 332.

Figure 11:
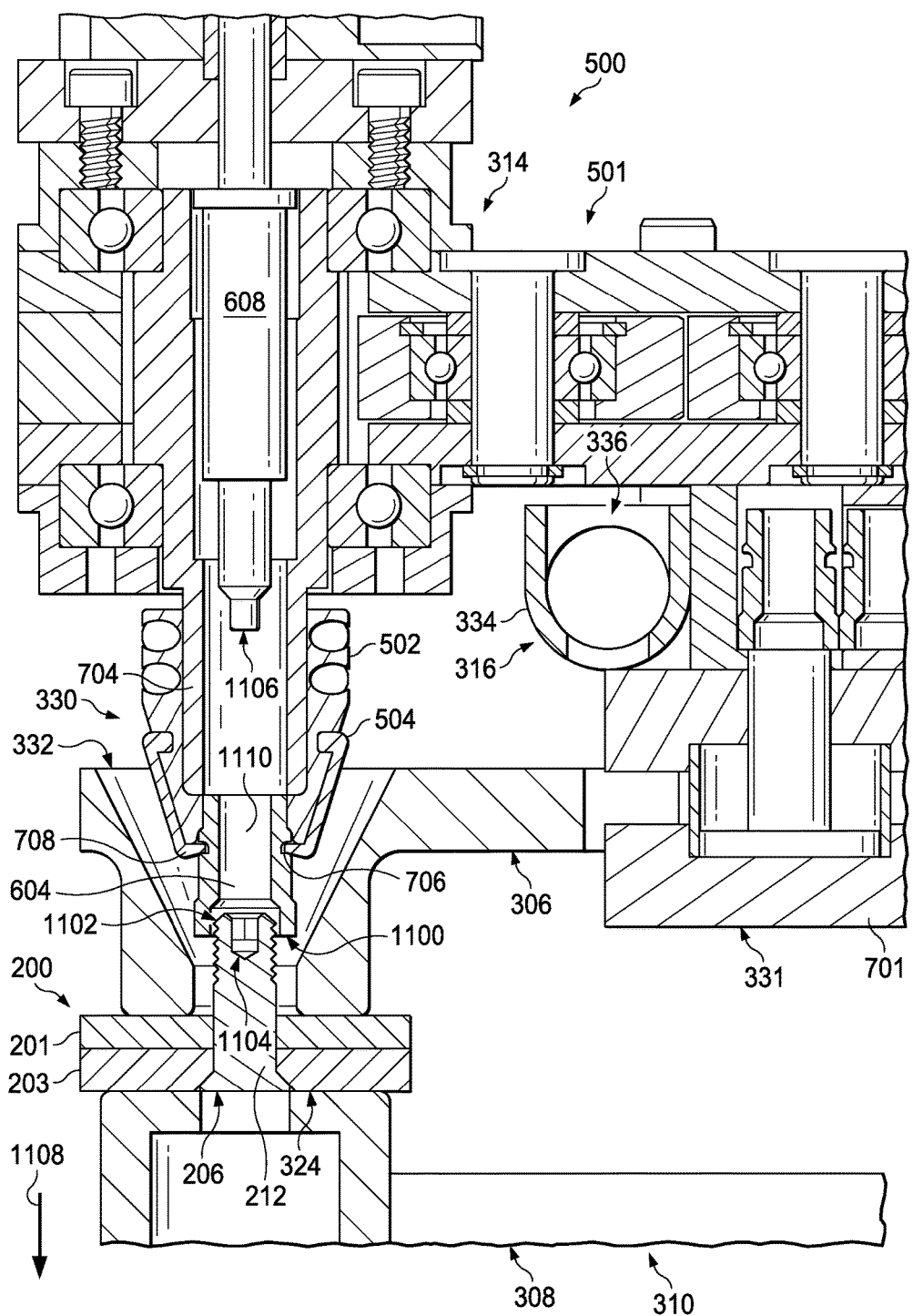
FIG. 11 is an illustration of a frangible collar in an installation feature in accordance with an illustrative embodiment.

With reference now to FIG. 11, an illustration of frangible collar 604 in installation feature 326 is depicted in accordance with an illustrative embodiment. In this illustrative example, actuation system 500 has moved frangible collar 604 through installation feature 326 such that frangible collar 604 may be placed over fastener 212. In particular, end 1100 of frangible collar 604 may be placed over end 1102 of fastener 212.

As depicted, fastener 212 may have socket 1104. Elongate member 608 may have tip 1106 configured to be received within socket 1104 of fastener 212. Tip 1106 may be an example of one implementation for first end 156 in FIG. 1. Socket 1104 may be an example of one implementation for second end 158 in FIG. 1.

In this illustrative example, socket 1104 may be a hexagonal socket and tip 1106 may have a hexagonal shape that fits within the hexagonal socket. Of course, in other illustrative examples, socket 1104 may be some other type of socket and tip 1106 may have some other type of shape.

Actuation system 500 may move elongate member 608 in the direction of arrow 1108 towards fastener 212 such that tip 1106 of elongate member 608 at least contacts end 1102 of fastener 212. Tip 1106 of elongate member 608 may pass through opening 1110 in frangible collar 604 to reach fastener 212.

In some cases, tip 1106 may engage socket 1104 when tip 1106 is moved in the direction of arrow 1108. In other examples, tip 1106 may not be rotationally aligned with socket 1104. In other words, tip 1106 may contact end 1102 of fastener 212 but may be unable to engage socket 1104 when moved in the direction of arrow 1108. Tip 1106 may need to be rotated in order for tip 1106 and socket 1104 to be properly aligned.

Figure 12:
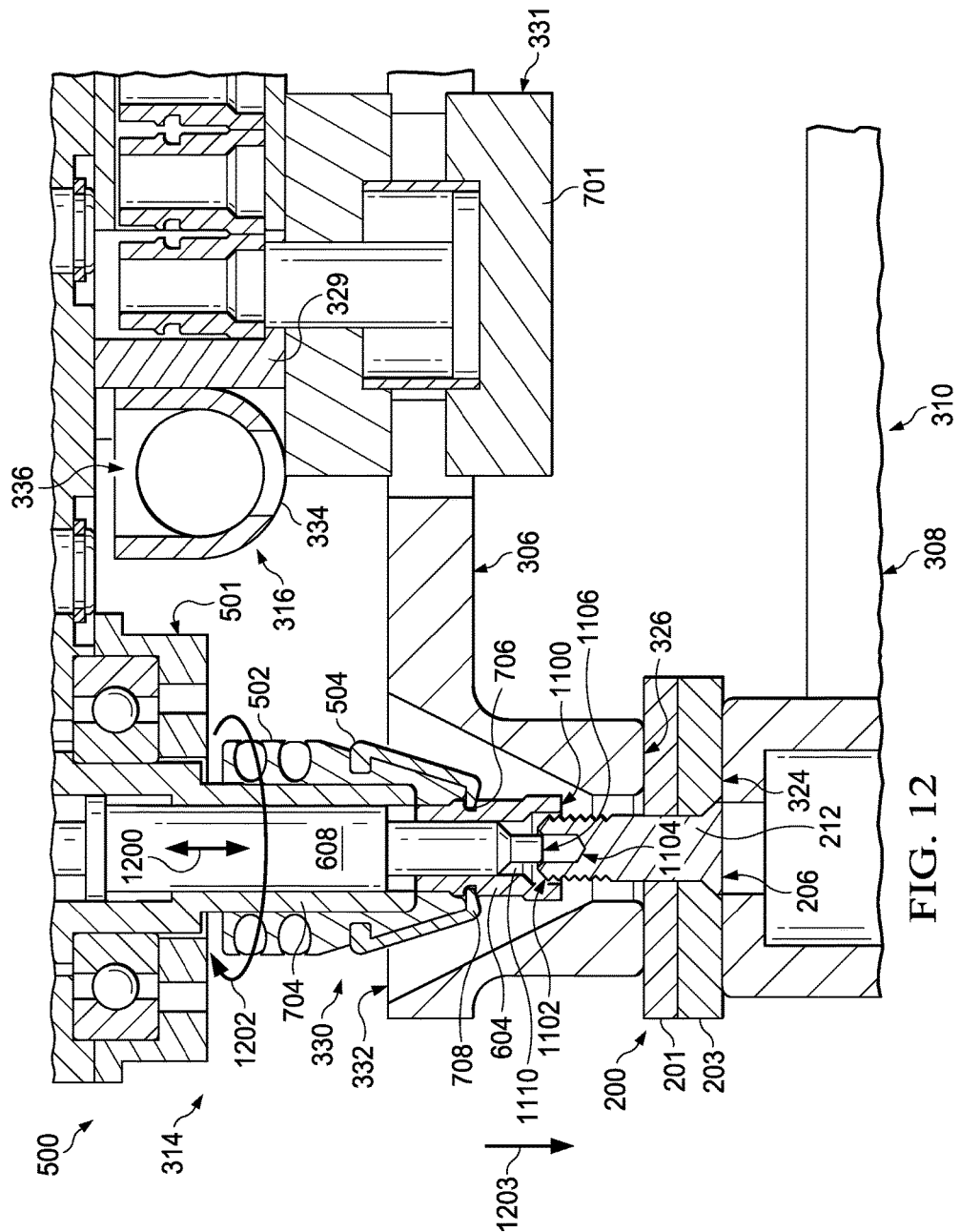
FIG. 12 is an illustration of a tip of an elongate member in contact with an end of a fastener in accordance with an illustrative embodiment.

With reference now to FIG. 12, an illustration of tip 1106 of elongate member 608 in contact with end 1102 of fastener 212 is depicted in accordance with an illustrative embodiment. As depicted, tip 1106 has not yet engaged socket 1104 but is in contact with end 1102 of fastener 212.

Rotatable member 502 may be rotated about center axis 1200 through rotatable member 502 in the direction of, for example, without limitation, arrow 1202. In particular, rotatable member 502 may be rotated according to preselected parameters. In other words, rotatable member 502 may be rotated a preselected number of turns.

Rotatable member 502 may be rotated while actuation system 500 is still applying force to elongate member 608 in the direction of arrow 1203 to move elongate member 608 in the direction of arrow 1203. As a result, rotation of rotatable member 502 may cause tip 1106 of elongate member 608 to properly align with socket 1104 of fastener 212 and engage socket 1104.

Figure 13:
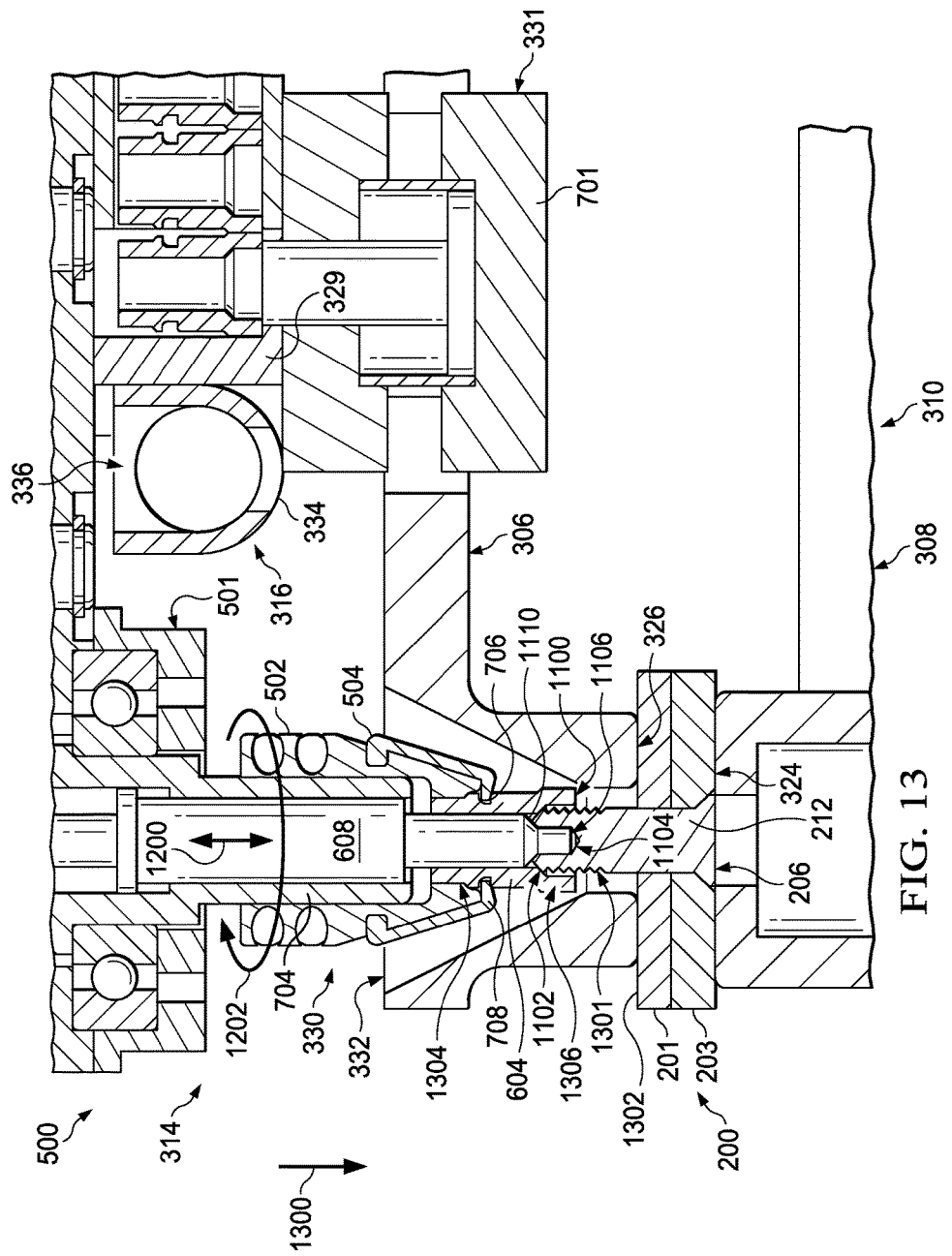
FIG. 13 is an illustration of a tip of an elongate member engaged with a socket of a fastener in accordance with an illustrative embodiment.

With reference now to FIG. 13, an illustration of tip 1106 of elongate member 608 engaged with socket 1104 of fastener 212 is depicted in accordance with an illustrative embodiment. As depicted, tip 1106 has engaged socket 1104.

Fastener 212 may have outer threads 1301. Further, at least a portion of frangible collar 604 at end 1100 of frangible collar 604 may have inner threads (not shown) configured to engage outer threads 1301 of fastener 212. Rotation of rotatable member 502 may cause frangible collar 604 to be threaded onto fastener 212.

In this manner, rotation of rotatable member 502 according to preselected parameters may cause tip 1106 to engage socket 1104 and frangible collar 604 to be threaded onto fastener 212. Threading frangible collar 604 onto fastener 212 may move frangible collar 604 relative to fastener 212 in the direction of arrow 1300 until end 1100 of frangible collar 604 reaches surface 1302 of first part 201.

Further, the number of turns and speed by which rotatable member 502 is rotated may determine the torque applied to frangible collar 604. Once the torque applied to frangible collar 604 reaches a selected threshold, first portion 1304 of frangible collar 604 may be configured to break away from second portion 1306 of frangible collar 604.

Figure 14:
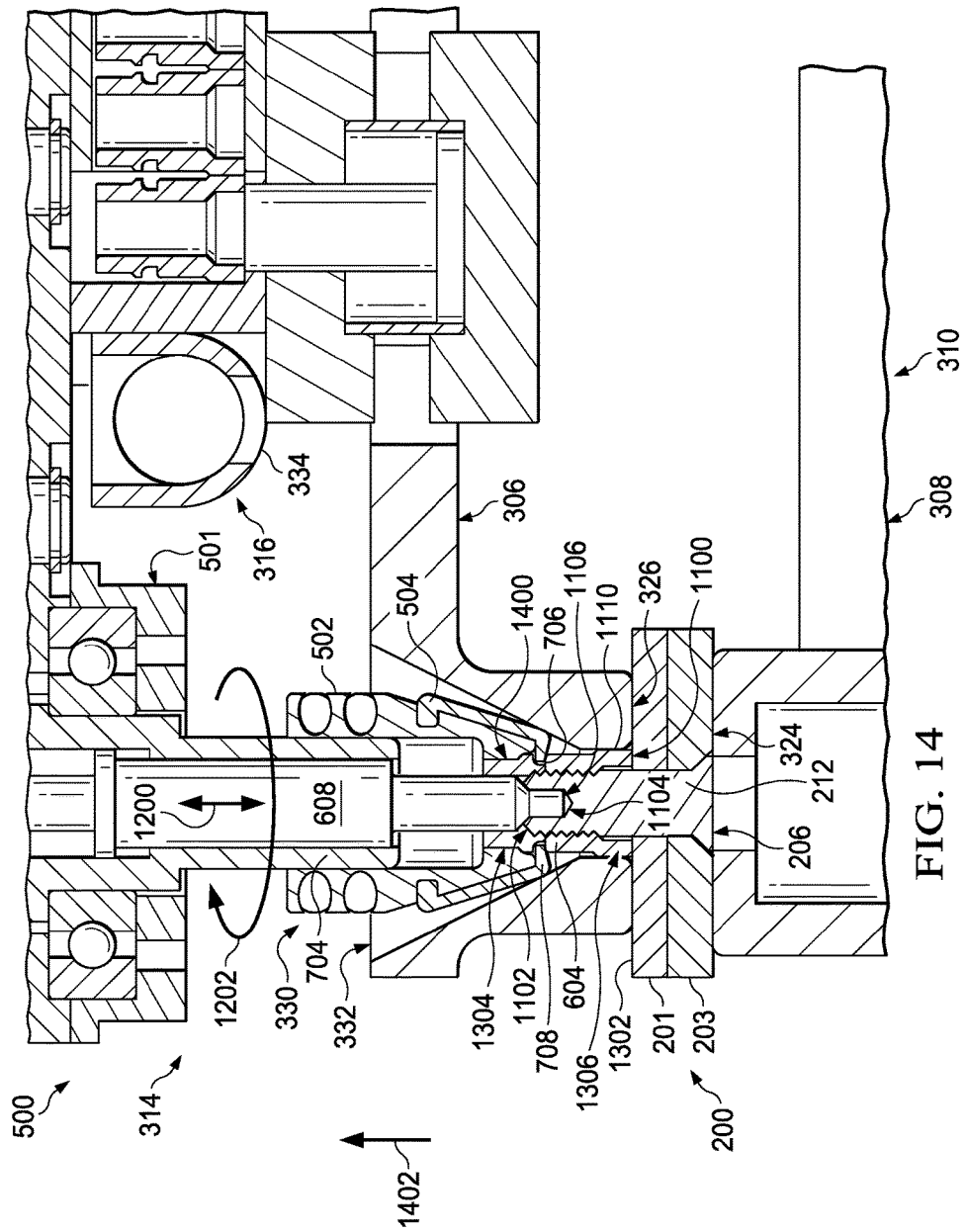
FIG. 14 is an illustration of a first portion of a frangible collar separated from a second portion of a frangible collar in accordance with an illustrative embodiment.

With reference now to FIG. 14, an illustration of first portion 1304 of frangible collar 604 separated from second portion 1306 of frangible collar 604 is depicted in accordance with an illustrative embodiment. In particular, first portion 1304 of frangible collar 604 has broken away from second portion 1306 of frangible collar 604. First portion 1304 may be removed as nut portion 1400, while second portion 1306 may remain installed over fastener 212 as collar 217. Element installer 314 may then be moved away from installation feature 326 in the direction of arrow 1402 by actuation system 500 to move nut portion 1400 away from collar 217.

Figure 15:
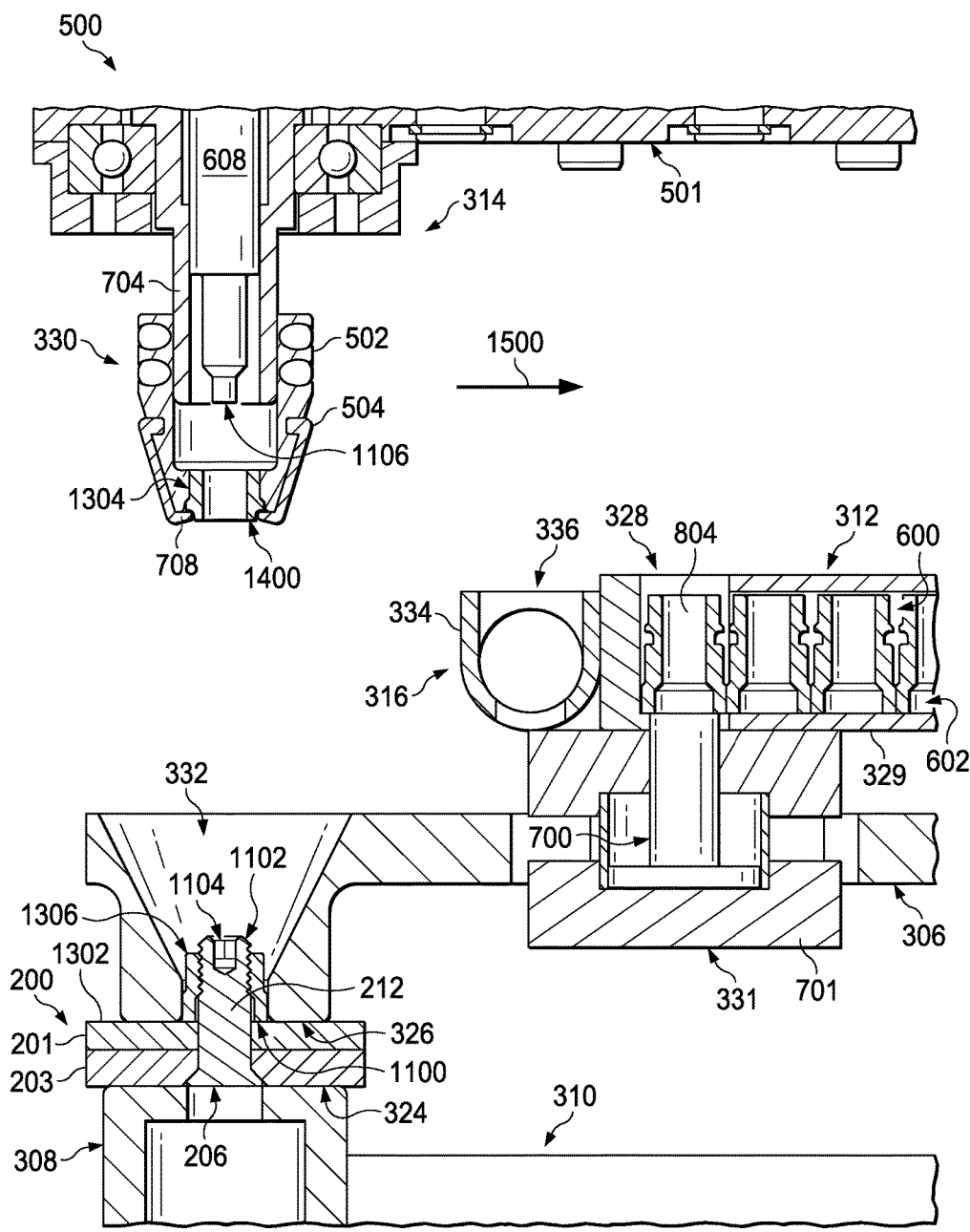
FIG. 15 is an illustration of an element installer moving a nut portion to a removal system in accordance with an illustrative embodiment.

Turning now to FIG. 15, an illustration of element installer 314 moving nut portion 1400 to removal system 316 is depicted in accordance with an illustrative embodiment. In this illustrative example, actuation system 500 has moved nut portion 1400 away from collar 217. Next, movement system 318 from FIG. 3 may move element installer 314 in the direction of arrow 1500 towards removal system 316.

Figure 16:
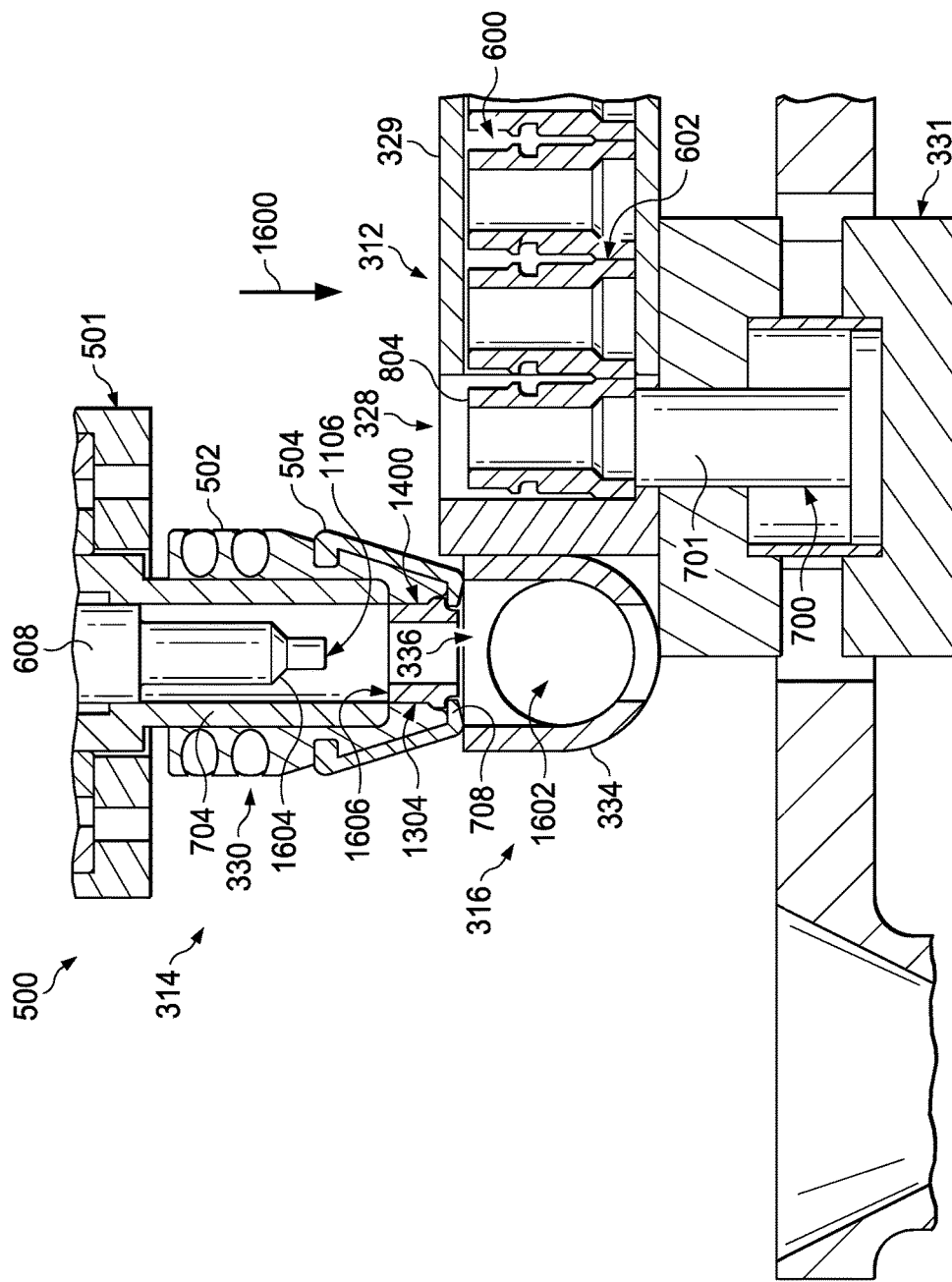
FIG. 16 is an illustration of a nut portion positioned over an opening into a vacuum tube in accordance with an illustrative embodiment.

With reference now FIG. 16, an illustration of nut portion 1400 positioned over opening 336 into vacuum tube 334 is depicted in accordance with an illustrative embodiment. In this illustrative example, nut portion 1400 has been positioned over opening 336 into vacuum tube 334 such that nut portion 1400 may be discarded.

Elongate member 608 may be moved in the direction of arrow 1600 to push nut portion 1400 out of retaining member 504 and into vacuum tube 334. In particular, nut portion 1400 may be pushed through opening 336 into channel 1602 inside vacuum tube 334. As depicted, elongate member 608 has interface feature 1604 configured to engage end 1606 of nut portion 1400 and apply force to nut portion 1400 to move nut portion 1400 in the direction of arrow 1600.

Figure 17:
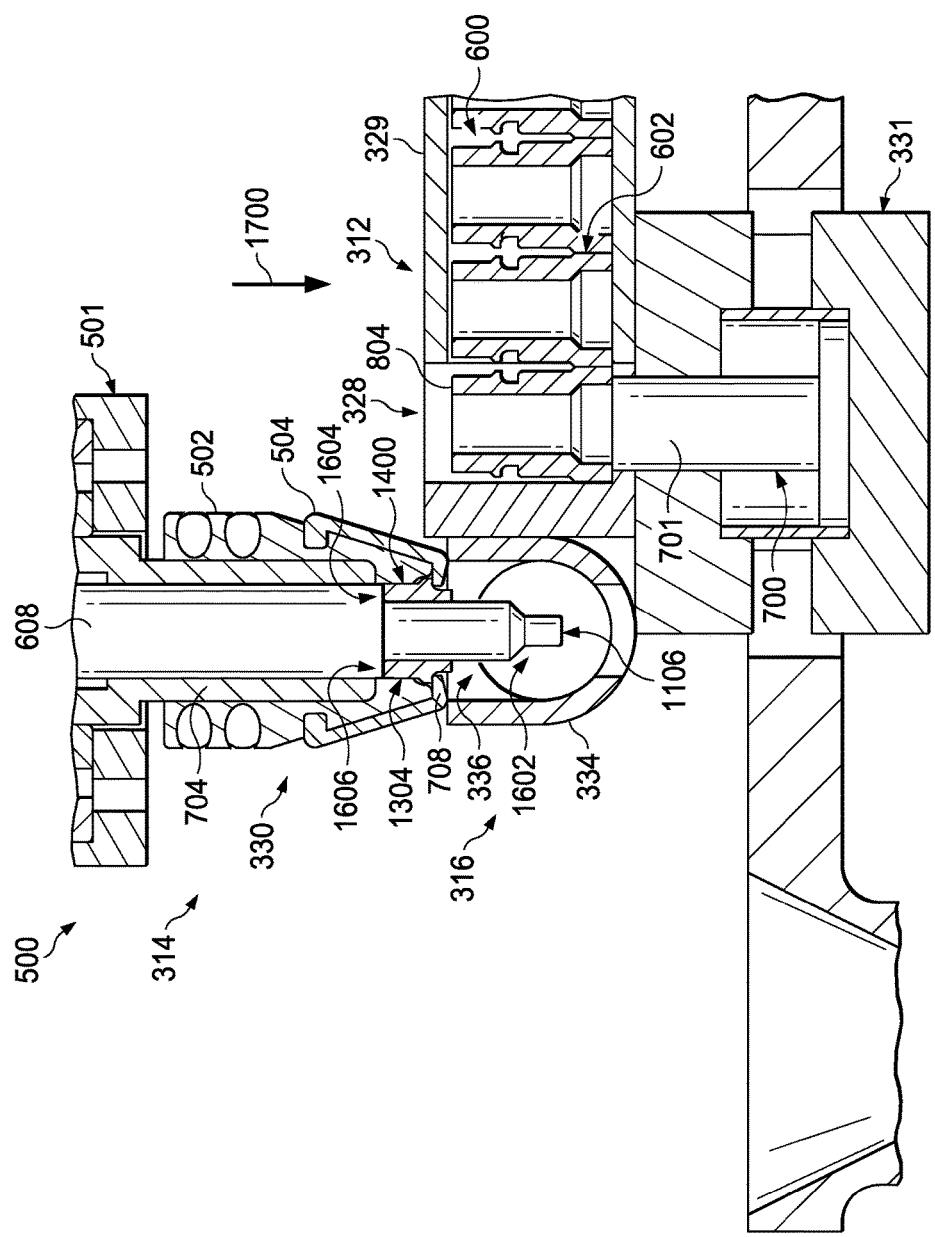
FIG. 17 is an illustration of an interface feature of an elongate member engaged with a nut portion in accordance with an illustrative embodiment.

With reference now to FIG. 17, an illustration of interface feature 1604 of elongate member 608 engaged with nut portion 1400 is depicted in accordance with an illustrative embodiment. In this illustrative example, interface feature 1604 has engaged with end 1606 of nut portion 1400. Further application of force in the direction of arrow 1700 will cause nut portion 1400 to be released from retaining member 504 and pushed into channel 1602 within vacuum tube 334.

Figure 18:
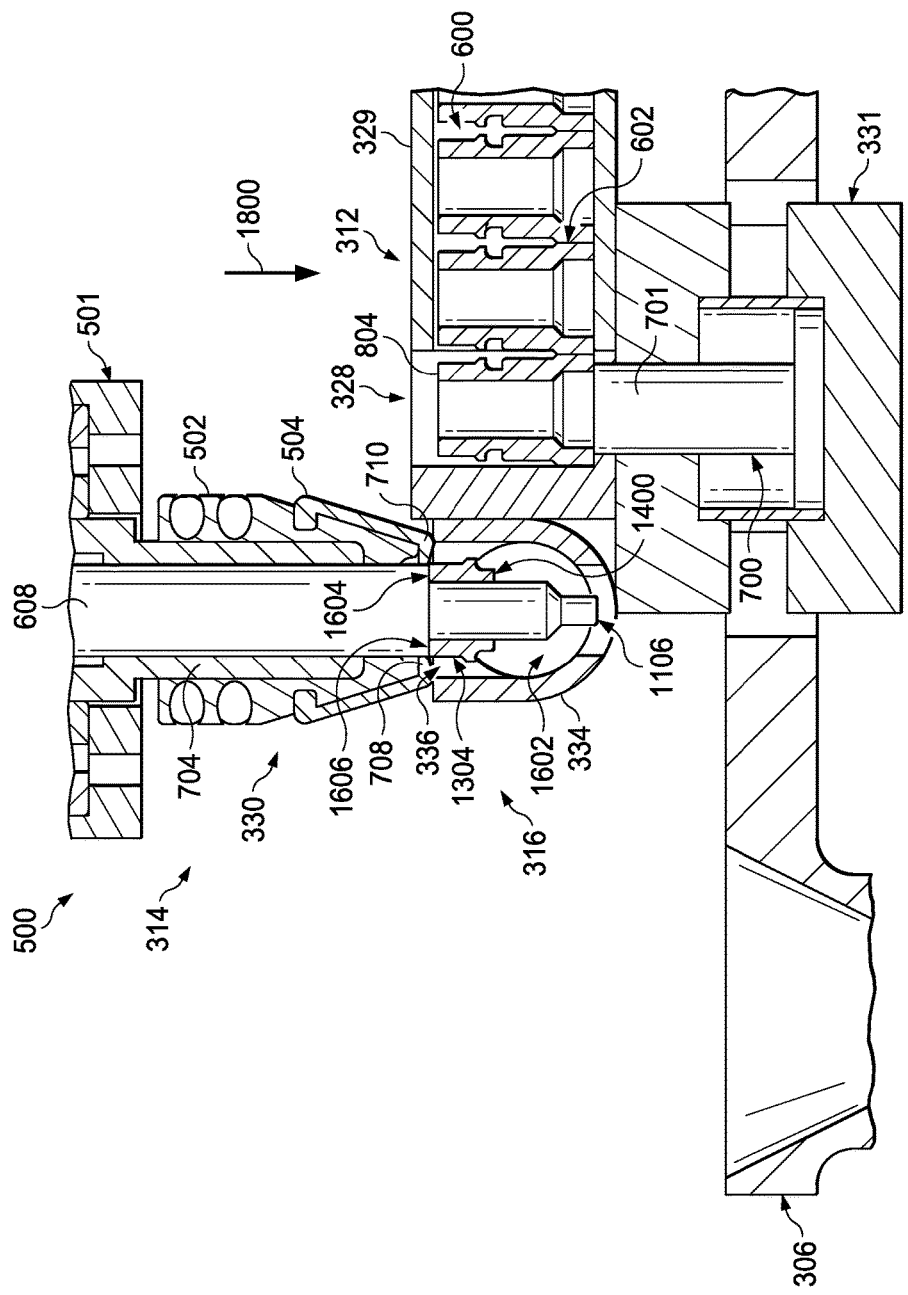
FIG. 18 is an illustration of a nut portion released from a retaining member in accordance with an illustrative embodiment.

Turning now to FIG. 18, an illustration of nut portion 1400 released from retaining member 504 is depicted in accordance with an illustrative embodiment. In FIG. 18, retaining member 504 may no longer be retaining nut portion 1400. Nut portion 1400 may be further moved in the direction of arrow 1800 into channel 1602 by the pushing force being applied by elongate member 608 and the pulling force being applied by the vacuum pressure within channel 1602.

Once nut portion 1400 enters channel 1602, the vacuum pressure within channel 1602 may cause nut portion 1400 to be moved through vacuum tube 334 and discarded. In one illustrative example, nut portion 1400 may be discarded into a receptacle or container (not shown) located at the end of vacuum tube 334.

Figure 19:
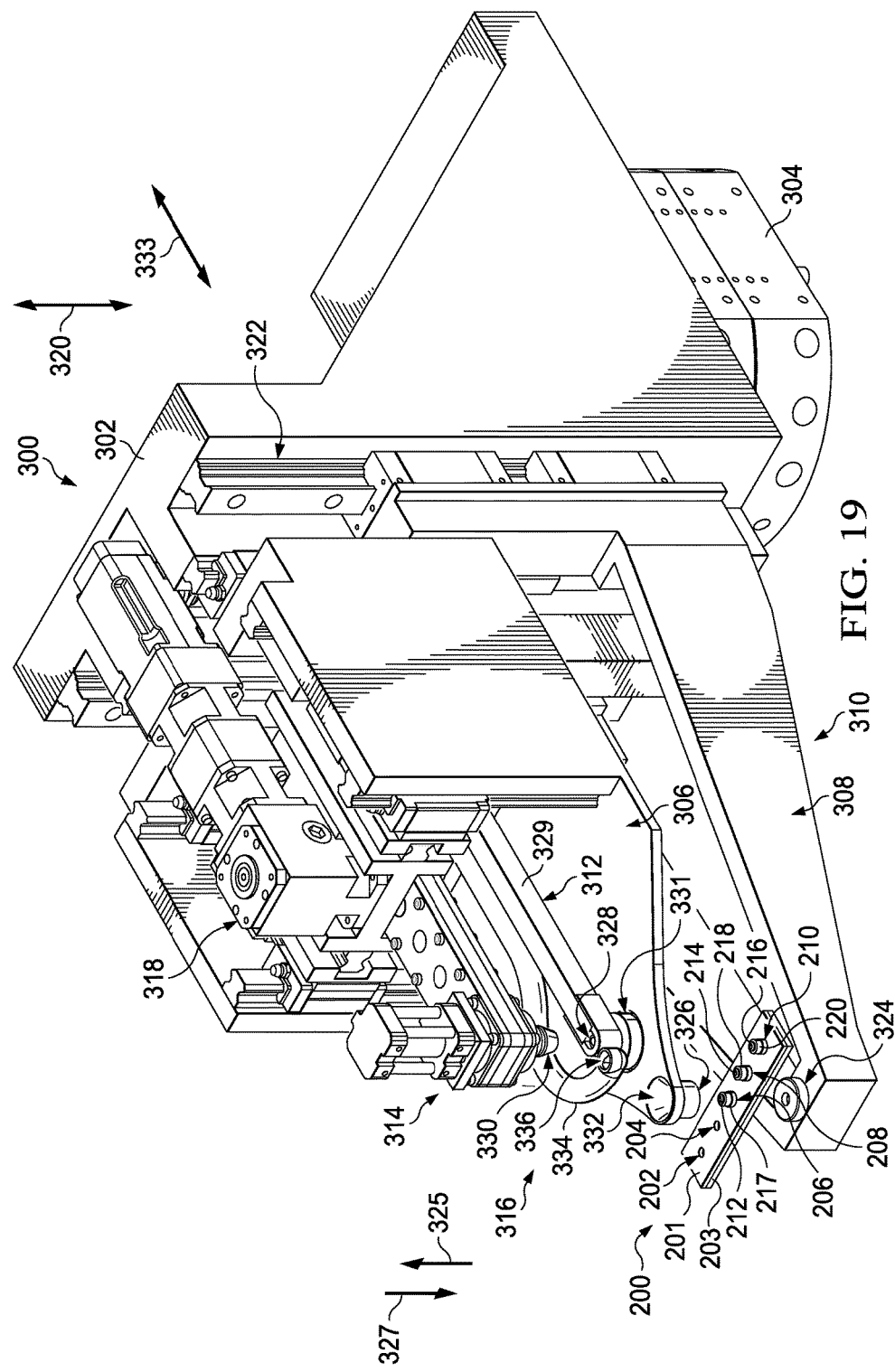
FIG. 19 is an illustration of an isometric view of an end effector unclamped from an object and a collar installed over a fastener in accordance with an illustrative embodiment.

With reference now to FIG. 19, an illustration of an isometric view of end effector 300 unclamped from object 200 and collar 217 installed over fastener 212 is depicted in accordance with an illustrative embodiment. In this illustrative example, first clamping device 306 and second clamping device 308 have been moved away from each other such that end effector 300 may unclamp from object 200. Further, collar 217 is depicted installed over fastener 212.

The illustrations of object 200 in FIG. 2 and end effector 300 in FIGS. 3-19 are not meant to imply physical or architectural limitations to the manner in which an illustrative embodiment may be implemented. Other components in addition to or in place of the ones illustrated may be used. Some components may be optional.

The different components shown in FIGS. 2-19 may be illustrative examples of how components shown in block form in FIG. 1 can be implemented as physical structures. Additionally, some of the components in FIGS. 2-19 may be combined with components in FIG. 1, used with components in FIG. 1, or a combination of the two.

Figure 20:
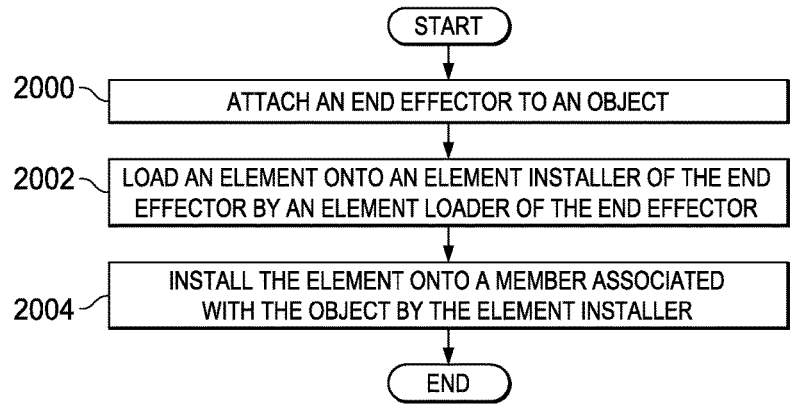
FIG. 20 is an illustration of a process for installing an element over a member associated with an object in the form of a flowchart in accordance with an illustrative embodiment.

With reference now to FIG. 20, an illustration of a process for installing an element over a member associated with an object is depicted in the form of a flowchart in accordance with an illustrative embodiment. The process illustrated in FIG. 20 may be implemented using end effector 102 in FIG. 1.

The process may begin by attaching end effector 102 to object 106 (operation 2000). Object 106 may be, for example, without limitation, a stackup of first part 108 and second part 110. Next, an element from number of elements 112 may be loaded onto element installer 128 of end effector 102 by element loader 126 of end effector 102 (operation 2002). The element may take the form of, for example, without limitation, frangible collar 145.

Thereafter, the element may be installed onto a member associated with object 106 by element installer 128 (operation 2004), with the process terminating thereafter. The member associated with object 106 may take the form of, for example, without limitation, threaded fastener 143 already installed in object 106.

Figure 21:
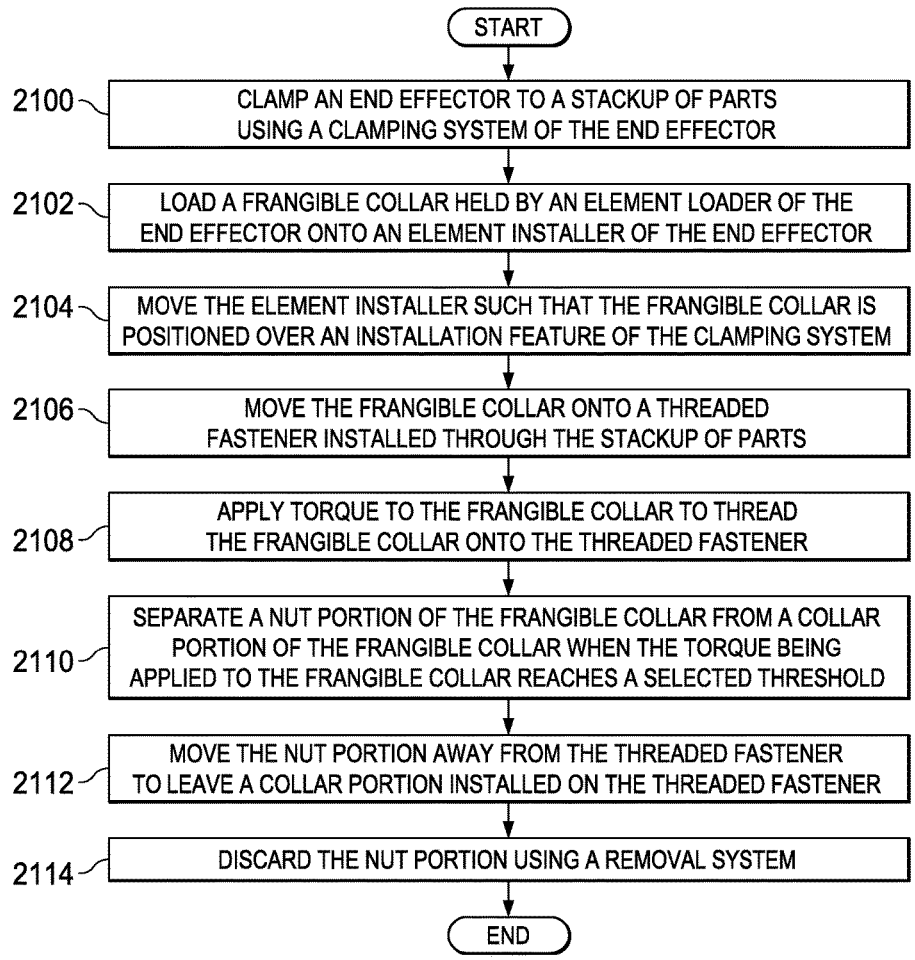
FIG. 21 is an illustration of a process for installing a frangible collar onto a threaded fastener in the form of a flowchart in accordance with an illustrative embodiment.

Turning now to FIG. 21, an illustration of a process for installing a frangible collar onto a threaded fastener is depicted in the form of a flowchart in accordance with an illustrative embodiment. The process illustrated in FIG. 21 may be implemented using end effector 102 in FIG. 1.

The process may begin by clamping end effector 102 to a stackup of parts using clamping system 136 of end effector 102 (operation 2100). Next, frangible collar 145 held by element loader 126 of end effector 102 may be loaded onto element installer 126 of end effector 102 (operation 2102).

Element installer 128 may then be moved such that frangible collar 145 is positioned over installation feature 142 of clamping system 136 (operation 2104). Thereafter, element installer 128 may move frangible collar 145 onto threaded fastener 143 installed through the stackup of parts through installation feature 142 (operation 2106).

Torque 153 may be applied to frangible collar 145 to thread frangible collar 145 onto threaded fastener 143 (operation 2108). Nut portion 151 of frangible collar 145 may be separated from collar portion 160 of frangible collar 145 when torque 153 being applied to frangible collar 145 reaches selected threshold 162 (operation 2110). Nut portion 151 may then be moved away from threaded fastener 143 to leave collar portion 160 installed on threaded fastener 143 (operation 2112). Nut portion 151 may then be discarded using removal system 132 (operation 2114), with the process terminating thereafter. In this manner, a collar may be installed on threaded fastener 143.

Illustrative embodiments of the disclosure may be described in the context of aircraft manufacturing and service method 2200 as shown in FIG. 22 and aircraft 2300 as shown in FIG. 23. Turning first to FIG. 22, an illustration of an aircraft manufacturing and service method is depicted in the form of a block diagram in accordance with an illustrative embodiment. During pre-production, aircraft manufacturing and service method 2200 may include specification and design 2202 of aircraft 2300 in FIG. 23 and material procurement 2204.

During production, component and subassembly manufacturing 2206 and system integration 2208 of aircraft 2300 in FIG. 23 takes place. Thereafter, aircraft 2300 in FIG. 23 may go through certification and delivery 2210 in order to be placed in service 2212. While in service 2212 by a customer, aircraft 2300 in FIG. 23 is scheduled for routine maintenance and service 2214, which may include modification, reconfiguration, refurbishment, and other maintenance or service.

Each of the processes of aircraft manufacturing and service method 2200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 23, an illustration of an aircraft is depicted in the form of a block diagram in which an illustrative embodiment may be implemented. In this example, aircraft 2300 is produced by aircraft manufacturing and service method 2200 in FIG. 22 and may include airframe 2302 with plurality of systems 2304 and interior 2306. Examples of systems 2304 include one or more of propulsion system 2308, electrical system 2310, hydraulic system 2312, and environmental system 2314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2200 in FIG. 22. In particular, end effector 102 from FIG. 1 may be used to install elements, such as, for example, number of frangible elements 116 in FIG. 1 during any one of the stages of aircraft manufacturing and service method 2200. For example, without limitation, end effector 102 from FIG. 1 may be used install number of frangible collars 120 onto number of threaded fasteners 118 during at least one of component and subassembly manufacturing 2206, system integration 2208, routine maintenance and service 2214, or some other stage of aircraft manufacturing and service method 2200. Further, number of frangible collars 120 may be installed to join together parts for different structures of airframe 2302 and/or interior 2306 in FIG. 23.

In one illustrative example, components or subassemblies produced in component and subassembly manufacturing 2206 in FIG. 22 may be fabricated or manufactured in a manner similar to components or subassemblies produced while aircraft 2300 is in service 2212 in FIG. 22. As yet another example, one or more apparatus embodiments, method embodiments, or a combination thereof may be utilized during production stages, such as component and subassembly manufacturing 2206 and system integration 2208 in FIG. 22. One or more apparatus embodiments, method embodiments, or a combination thereof may be utilized while aircraft 2300 is in service 2212 and/or during maintenance and service 2214 in FIG. 22. The use of a number of the different illustrative embodiments may substantially expedite the assembly of and/or reduce the cost of aircraft 2300.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, without limitation, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus that comprises:
   an element loader that comprises: a loading device connected, via a clamping device, to an installation feature, and a holder that comprises a length configured to hold multiple elements such that a length of each element, in the multiple elements held inside the holder, aligns perpendicular to the length of the holder: and
   an element installer, that comprises an elongate member configured to:
      move linearly, parallel to the length of the holder, between a position centered over the opening in the holder and a position centered over an opening in the installation feature;
      move perpendicular to the length of the holder to receive, while in the position centered over the opening in the holder, an element in the multiple elements from the element loader;
      move linearly, parallel to the length of the holder, to a position over a member associated with an object; and
      move perpendicular to the length of the holder to place the element onto the member associated with the object; and
      rotate to connect the element to the member.

2. The apparatus of claim 1, further comprising:
   the loading device comprising a loading member that comprises:
      a diameter smaller than a diameter of an opening in the holder; and
      a length of the loading member aligned perpendicular to the length of the holder;
   the element installer configured to apply a torque to the element to install the element onto the member; and
   a retaining member connected to a rotatable member of the element installer configured to engage a groove that separates a nut portion of the element from a collar portion of the element.

3. The apparatus of claim 2, wherein the element is a frangible element comprising:
   a first portion; and
   a second portion, the first portion configured, responsive to a torque on the frangible element comprising a selected threshold, to break off from the second portion.

4. The apparatus of claim 3 further comprising:
   a removal system configured for use in discarding the first portion of the frangible element.

5. The apparatus of claim 3, wherein the element installer comprises:
   a rotatable member configured to rotate the frangible element when the frangible element is placed over the member to apply the torque to the frangible element.

6. The apparatus of claim 3, wherein the element installer comprises:
   a retaining member configured to receive the frangible element from the element loader and retain the frangible element, wherein the retaining member retains the first portion of the frangible element after the first portion breaks away from the second portion of the frangible element.

7. The apparatus of claim 3, wherein the frangible element is a frangible collar.

8. The apparatus of claim 1, wherein the element installer comprises:
   the elongate member configured to align the element with the member; and
   an actuation system configured to actuate the elongate member.

9. The apparatus of claim 8, wherein the member comprises a socket and the elongate member comprises a tip that comprises a shape configured to fit within the socket.

10. The apparatus of claim 1, further comprising:
    the holder configured such that the length of the holder aligns beneath, and in a direction of, a length of a base that connects a movement system to the element installer; and
    the loading device configured to load the element onto the element installer.

11. The apparatus of claim 1, wherein the element is a threaded fastener.

12. The apparatus of claim 1, further comprising:
    a movement system configured to move, perpendicular to the length of the holder, the element installer towards and away from the element loader, and in a direction of a length of the element loader.

13. The apparatus of claim 1, further comprising:
    the installation feature centered along an extended length of the holder; and
    a second clamping device that comprises an engagement feature concentric with the installation feature.

14. The apparatus of claim 1, further comprising the member configured to join a first part and a second part to each other.

15. An end effector comprising:
    an element loader that comprises: a loading device connected, via a clamping device, to an installation feature, and a holder that comprises a length configured to hold multiple frangible collars, such that a frangible collar, of the multiple frangible collars, comprises: a nut portion, and a collar portion, and a groove between the collar portion and the nut portion, such that a length the frangible collar, held inside the holder, aligns perpendicular to the length of the holder, such that the loading device comprises:
a loading member that comprises:
a diameter smaller than a diameter of an opening in the holder; and
a length of the loading member aligned perpendicular to the length of the holder; and
an element installer, that comprises: a retaining member connected to rotatable member, and an elongate member configured to:
move linearly, parallel to the length of the holder, between a position centered over the holder and a position centered over an opening in the installation feature;
engage the groove of the frangible collar via the retaining member;
move perpendicular to the length of the holder to receive, while positioned over an opening in the holder, the frangible collar from the element loader;
move linearly, parallel to the length of the holder, to a position over a member associated with an object; and
move perpendicular to the length of the holder to install the frangible collar onto the member associated with the object, such that the element installer comprises:
the rotatable member configured to apply a torque to and rotate, while positioned over an engagement feature, and responsive to being positioned over a threaded fastener associated with the object, the frangible collar until installation of the frangible collar onto the threaded fastener, the nut portion of the frangible collar configured to separate from the collar portion of the frangible collar responsive to the torque comprising a selected threshold; and
the retaining member configured to receive the frangible collar from the element loader and retain the frangible collar such that the retaining member retains the nut portion of the frangible collar after the nut portion separates from the collar portion of the frangible collar; and
a removal system that comprises an opening of a vacuum tube configured to receive, from the retaining member, the nut portion separated from the collar portion, such that the opening of the vacuum tube abuts an end of the holder and centers along an extension of the length the holder.

16. A method for installing an element over a member associated with an object, the method comprising:
positioning an element installer over an opening in a holder in an element loader of an end effector;
loading, by a loading device moving through the opening, the element onto the element installer;
moving, along an X-axis in a direction of a length of the element loader, the element installer from over the opening to over an installation feature aligned, along the X-axis; and
installing, by moving, along a Z-axis, an elongate member within the element installer, the element onto the member associated with the object and applying a torque to the element to install the element onto the member, wherein the element is a frangible element.

17. The method of claim 16, wherein installing the element onto the member associated with the object further comprises:
separating a first portion of the frangible element from a second portion of the frangible element when the torque being applied to the frangible element reaches a selected threshold.

18. The method of claim 17 further comprising:
discarding the first portion of the frangible element after the first portion has separated from the second portion of the frangible element using a removal system of the end effector comprising a vacuum tube, comprising an opening, aligned, along the X-axis, with the length of the element loader, of the vacuum tube, located below the element installer.

19. The method of claim 16, wherein loading the element onto the element installer comprises:
moving the element from within a chamber within the holder of the element loader to the opening and then towards a retaining member of the element installer using the loading device and engaging the element onto the element installer.

20. The method of claim 19, wherein moving the element from within the holder of the element loader towards the retaining member of the element installer using the loading device to load the element onto the element installer comprises:
moving the element from within the holder of the element loader towards the retaining member of the element installer using the loading device until an interface feature of the retaining member snaps into a groove on the element.

21. A method for installing a frangible collar, the method comprising:
clamping an end effector to a stackup of parts using a clamping system comprising a first clamping device comprising an installation feature located along an X-axis aligned in a direction of a length of an element loader;
loading a frangible collar held by the element loader of the end effector onto an element installer of the end effector via moving the element installer above an opening in the element loader and moving a loading device through the opening;
moving, along the X-axis, the element installer such that the frangible collar is positioned over the installation feature;
moving, along a Z-axis through the installation feature, the frangible collar onto a threaded fastener installed through the stackup of parts;
applying a torque to the frangible collar, thereby threading the frangible collar onto the threaded fastener;
separating a nut portion of the frangible collar from a collar portion of the frangible collar when the torque being applied to the frangible collar reaches a selected threshold;
moving the nut portion away from the threaded fastener to leave the collar portion installed on the threaded fastener; and
discarding the nut portion using a removal system via pressing an interface feature of an elongate member in the element installer against the nut portion and vacuuming the nut portion into a vacuum tube located below the element installer.

* * * * *

UNITED STATES PATENT AND TRADEMARK OFFICE
CERTIFICATE OF CORRECTION

PATENT NO.        : 10,046,377 B2
APPLICATION NO.   : 14/036495
DATED             : August 14, 2018
INVENTOR(S)       : Batt Page 1 of 1

It is certified that error appears in the above-identified patent and that said Letters Patent is hereby corrected as shown below:

In the Claims

Column 17, Line 45, Claim 1 change "over the opening" to --over an opening--
Column 17, Line 62, Claim 2 change "of an opening" to --of the opening--
Column 18, Line 16, Claim 5 change "a rotatable member" to --the rotatable member--
Column 18, Line 67, Claim 15 change "a length the" to --a length of the--
Column 19, Line 10, Claim 15 change "to rotatable member" to --to a rotatable member--
Column 19, Line 19, Claim 15 change "over an opening" to --over the opening--

Signed and Sealed this
Fourth Day of December, 2018

Andrei Iancu
*Director of the United States Patent and Trademark Office*